United States Patent
Neben et al.

(10) Patent No.: US 10,438,291 B1
(45) Date of Patent: *Oct. 8, 2019

(54) SYSTEMS AND METHODS FOR MANAGING BENEFITS IN A HEALTH PLAN

(75) Inventors: Kathleen Neben, Denver, CO (US); Scott Johnson, Wheaton, IL (US); Gail Knopf, Louisville, KY (US); Charlene Kay Seidenschwarz, Ringoes, NJ (US); Tonya Lane, Gilbert, AZ (US)

(73) Assignee: Cognizant TriZetto Software Group, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,185

(22) Filed: Apr. 30, 2010

(51) Int. Cl.
 *G06F 19/00* (2018.01)
 *G06Q 40/08* (2012.01)

(52) U.S. Cl.
 CPC .................... *G06Q 40/08* (2013.01)

(58) Field of Classification Search
 CPC .... G06Q 10/10; G06Q 30/0207; G06Q 30/20; G06F 19/328
 USPC .................................... 705/2–4, 14
 See application file for complete search history.

(56) References Cited

U.S. PATENT DOCUMENTS

| | | | | |
|---|---|---|---|---|
| 7,219,071 | B2 * | 5/2007 | Gallagher | 705/14.14 |
| 7,366,675 | B1 | 4/2008 | Walker et al. | |
| 7,392,224 | B1 | 6/2008 | Bauer et al. | |
| 8,660,861 | B2 | 2/2014 | Chun et al. | |
| 2002/0103680 | A1 | 8/2002 | Newman | |
| 2002/0147641 | A1 * | 10/2002 | Hickford et al. | 705/14 |
| 2002/0152097 | A1 * | 10/2002 | Javors | 705/2 |
| 2002/0178056 | A1 * | 11/2002 | Lim | 705/14 |
| 2003/0009355 | A1 * | 1/2003 | Gupta | 705/2 |
| 2003/0065561 | A1 | 4/2003 | Brown et al. | |
| 2003/0200142 | A1 * | 10/2003 | Hicks et al. | 705/14 |
| 2005/0187800 | A1 * | 8/2005 | Luftig | 705/4 |
| 2005/0228692 | A1 * | 10/2005 | Hodgdon | 705/2 |
| 2006/0041454 | A1 | 2/2006 | Matisonn et al. | |
| 2006/0136258 | A1 * | 6/2006 | Horn et al. | 705/2 |
| 2006/0178915 | A1 * | 8/2006 | Chao | 705/4 |

(Continued)

OTHER PUBLICATIONS

Information Sheet on Medica Wellness Credits Program. Aug. 28, 2008. http://web.archive/org/web/20080828153148/http://www.mchamn.com/docs/hlwellness/pdf.*

(Continued)

*Primary Examiner* — Elda G Milef
(74) *Attorney, Agent, or Firm* — Dawn-Marie Bey; Bey & Cotropia PLLC

(57) ABSTRACT

Systems and methods for managing a health plan are described. In one embodiment, a method for managing a health plan includes presenting options for a health plan and an incentive program of the health plan, presenting options for configuring a health plan and an incentive program of the health plan, and receiving a selection of an incentive program. In other aspects, the method further comprises receiving a selection of a health plan and an incentive program, storing information about the selected health plan and incentive program, storing information regarding participation in the incentive program, and requesting a reward for a member for completion of the incentive program. In other aspects, the method may further include determining eligibility for an incentive program and a reward of the incentive program.

20 Claims, 31 Drawing Sheets

(56) References Cited

U.S. PATENT DOCUMENTS

| | | | | |
|---|---|---|---|---|
| 2006/0259362 A1* | 11/2006 | Cates | ............................... | 705/14 |
| 2008/0033750 A1* | 2/2008 | Burriss et al. | .................... | 705/2 |
| 2008/0071574 A1* | 3/2008 | Merkin | ............................. | 705/2 |
| 2009/0216629 A1* | 8/2009 | James et al. | .................... | 705/14 |
| 2011/0119075 A1* | 5/2011 | Dhoble | ............................. | 705/2 |

OTHER PUBLICATIONS

Baker, Geoffrey. Pay for Performance Incentive Programs in Healthcare. Research Report. 2003. http://www.leapfroggroup.org/media/file/Leapfrog-Pay_for_Performance_Briefing.pdf.*

PRNewswire. Medica Uses Hallmark Insights to Drive Participation in My Health Manager From Medica. Jul. 21, 2009. http://www.prnewswire.com/news-releases/medica-uses-hallmark-insights-to-drive-participation-in-my-health-manager-from-medicasm-62241252.html.*

Hallmark Insights Corporate Business Sheet. Jun. 21, 2006. www.hallmarkinsights.com/Documents/Fact_Sheet_final2.doc.*

Kentucky Employee Health Program FAQ on Virgin Healthmiles. Jan. 9, 2009. http://personnel.ky.gov/NR/rdonlyres/B01F8D1B-4C69-4ABE-987C-BA706877C6EE/0/KEHPVirginHealthMiles.pdf.*

Virgin Healthmiles Handbook. Apr. 10, 2009.http://personnel.ky.gov/NR/rdonlyres/E4205E69-E9D8-44BA-899C-D83F0C389DAC/0/VirginHealthMilesHandbookPDF3384KB.pdf.*

Virgin Healthmiles Program Offers Free Loot for Exercising. May 3, 2009. http://www.shrinkgeek.com/2009/05/03/virgin-healthmiles-program-offers-free-loot-for-exercising/.*

PDHI website on ConXus program. Apr. 1, 2009. http://web.archive.org/web/20091213151707/http://www.pdhi.com/products/ConXusProfile.asp.*

* cited by examiner

SYSTEMS AND METHODS FOR MANAGING BENEFITS IN A HEALTH PLAN

CROSS-REFERENCE TO RELATED APPLICATIONS

This application relates to U.S. patent application Ser. No. 12/771,212, entitled "Systems and Methods for Managing Benefits in a Health Plan," filed Apr. 30, 2010, and is incorporated by reference in its entirety.

FIELD OF THE INVENTION

This invention relates generally to systems and methods for managing benefits of a member in a health plan.

BACKGROUND

Conventionally, when a member of a health insurance plan performs an action that can benefit the member's health, whether a proactive or a condition-specific action or an education program or medical procedure, the member often does not receive incentives unique to that member. Some plans allow for a member's co-pay to decrease. However, this decrease is obtained by manually transferring the member from a first medical pan to a second medical pan in order for the member to obtain this benefit. In that example, the only difference between the first medical plan and the second medical plan is that the co-pay for selected services or procedures as covered by the second medical plan is lower than the co-pay for those services or procedures as covered by the first medical plan. As a result, if an employer desires to offer this option, then the payer must set up and maintain twice as many medical plans. The additional medical plans can become very complicated and very burdensome to manage, especially when the payer or health insurance company wants to report to the employer on the performance of all of the medical plans at the end of the year. It is also difficult to track which members are eligible for which plans and at what point in time. An additional complication falls to providers who are unclear what co-payments to collect from patients at the point of service. If they contact the payer directly to obtain this information, it may be difficult to get a correct response form the payer's customer service representative. Conventional systems are also deficient in effectively communicating to members which programs in which the members are eligible to participate in; displaying the details of those programs; enabling member program enrollment; and tracking member performance. Further, it is difficult to track which employer groups and classes within groups receive certain offerings. Additionally, when presenting an incentive to one member such as a subscriber, it remains questionable whether that incentive should also apply to a subscriber's dependents, such as the subscriber's children.

Conventional claims systems adjudicate claims using the same methodology for all members in a plan and do not have the ability to apply benefits that are unique to a member. Typically, current systems are so inflexible that such a configuration would be extremely difficult to manage and be very difficult to implement on a large scale. Accordingly, it is desirable to have a system that can provide member-specific benefits without any of the above-identified disadvantages.

Participants in a health care system are burdened by the administrative overhead. Different employers have different programs and different vendors. Managing these relationships or even a list of which members are eligible for certain rewards can be very challenging. For example, reward vendors need to be able to verify that the member is really eligible to receive a reward. Additionally, it can be administratively difficult to effectively communicate with health and wellness program vendors in a timely fashion, such as receiving member completion data to trigger reward generation. Accordingly, it is desirable to have a system that provides more administrative efficiency for centralized auditing and tracking.

SUMMARY

The methods and systems described herein can provide advantages over conventional systems and methods. In one aspect, the methods and systems can provide member-specific benefits. For example, if a member performs an action, the member can receive incentives or rewards, such as lower co-pay for a service or medication. Unlike conventional systems and methods, the member-specific benefits may be applied on a member level. As a result, in the same health insurance plan, one member may be charged a $25 co-pay for asthma office visits and another may have only a $10 asthma office visit co-pay as a result of completing an asthma education program. Similar programs can be established for conditions such as asthma, diabetes, lower back pain, or for specific services, such as chiropractic care or physical therapy. Within a single medical plan, each condition may have different benefit levels that are awarded at the completion of the designated activities. These member specific benefit levels may be applied to unique members without altering their medical plan. The value based benefit system described herein provides this functionality.

In another aspect, the methods and systems allow the flow of information between program vendors (e.g., a smoking cessation vendor), reward vendors (e.g., an organization providing a member reward), members, and others in real-time (or file-based) depending on the needs and capabilities of the participants. A centralized value based benefits solution manages the information and distribution processes used to send data to and from each of the participants. Advantages over conventional methods and systems include: allowing multiple programs to run at the same time for the same member; centralized auditing and tracking; no duplicate files or errors based on duplicative files and requests; files only need to be changed or updated once by a participant; and more comprehensive programs are feasible.

In one embodiment, a health care management system comprises a server configured to execute a value based benefits manager module, a payer web application, and a member web application, wherein the value based benefits manager determines eligibility of a member for a reward from an incentive program, wherein the payer web application allows a payer to configure an incentive program, and wherein the member web application allows a member to manage participation in an incentive program; a database coupled to the server and configured to store records having data relating to an incentive program; and a communication network for transmitting between the server and a payer's computer and between the server and a member's computer.

In another embodiment, a computer-implemented method for managing a health plan comprises presenting, by a server to a computer of a payer, options for configuring a health plan; receiving, from the computer of the payer to the server, a selection of an incentive program; associating, by the server, the incentive program to the health plan; presenting, by the server to a computer of an employer, an option for a health plan and an incentive program; receiving, by the server from the computer of the employer, a selection of a health plan and an incentive program; storing, in a database communicatively coupled to the server, information about the employer's selected health plan and incentive program; storing, in the database, information regarding participation in the incentive program; and requesting, by the server to a claims processing system or a computer of a reward vendor, a reward for a member for completion of the incentive program.

In yet another embodiment, a computer-implemented method for managing an incentive program for a health plan comprises receiving, by a server from a member of the health plan, a selection of an incentive program to enroll; receiving in real-time, by the server, a notification that the member has completed at least a portion of the incentive program; storing, in a database, information about the completion of the incentive program; determining eligibility of the member for a reward for completion of the incentive program; presenting, by the server, an option to the member for activating a reward; and transmitting, by the server to a claims processing system, a computer of a reward vendor, or a pharmacy benefit manager, a message indicating completion of the incentive program and approval for an enhanced benefit to the member.

In another embodiment, a computer-implemented method for providing member-specific benefits comprises recording, by a server, an enrollment of a member in a health plan in a database; providing an incentive program to a member for an enhanced benefit in the health plan; receiving, by the server, a notification that the member has complete a program that entitles the member to receive the enhanced benefit; determining, by the server, eligibility of the member for the enhanced benefit in the health plan; applying, by the server, in real-time the enhanced benefit of the eligible member to a claims processing system, pharmacy benefit manager, or a payroll system, wherein the member receives the enhanced benefit while staying enrolled in the health plan.

In yet another embodiment, a computer-implemented method for providing enhanced benefits comprises receiving, by a server, information from a member regarding enrollment and participation in an incentive program; applying, by the server, rules for rewards and eligibility of an enhanced benefit based on the information regarding enrollment and participation; providing, by the server, an indication of eligibility for the enhanced benefit, wherein the enhanced benefit applies only to the member who participated in the incentive program, and wherein a claim from the member is processed and applies the enhanced benefit without altering the health plan of the member.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIGS. 3a to 3m show screenshots of a payer web application according to an exemplary embodiment.

FIGS. 4a to 4c show screenshots of a payer web application according to an exemplary embodiment.

FIGS. 6a to 6d show screenshots of a member web application according to an exemplary embodiment.

DETAILED DESCRIPTION

Figure 1:
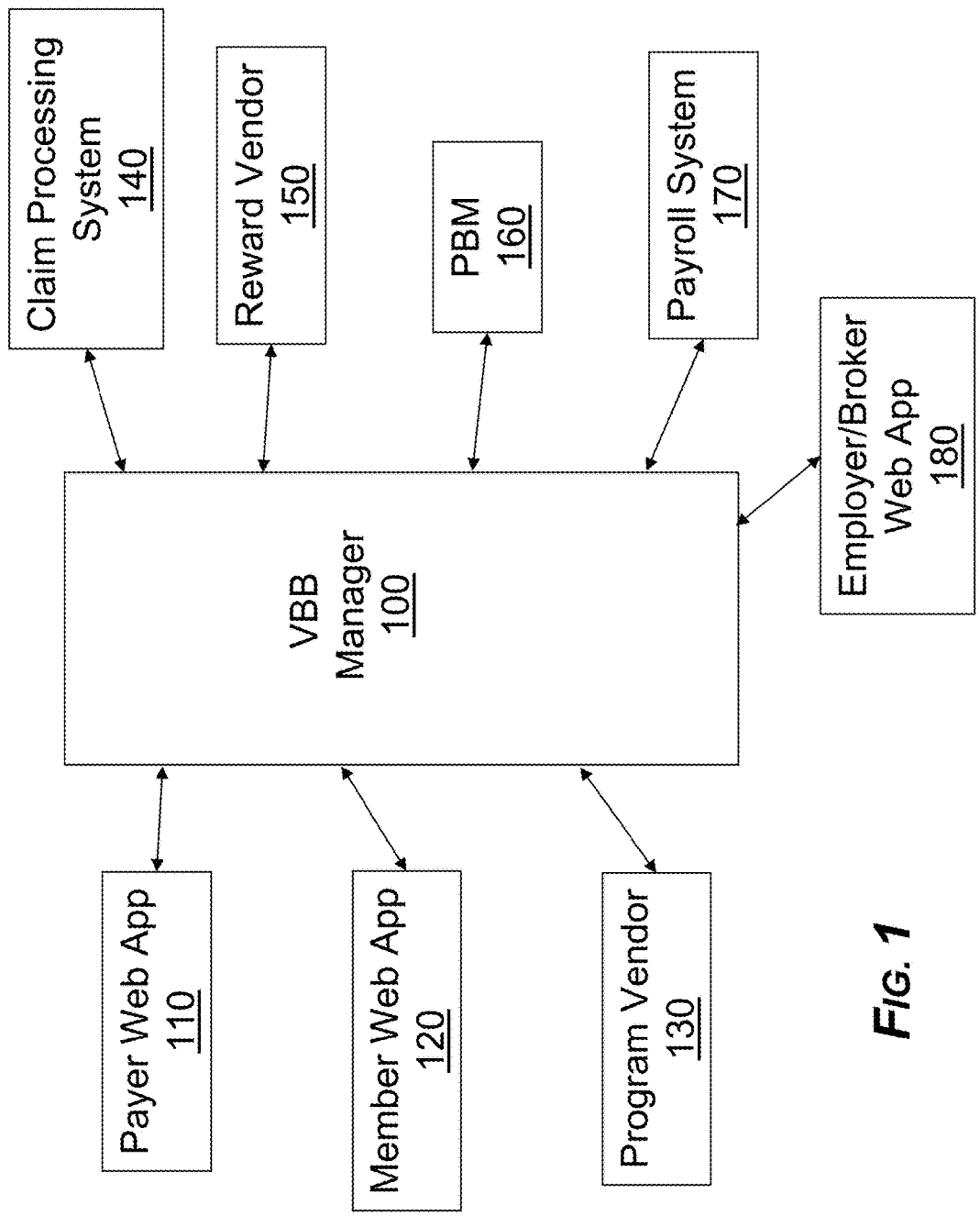
FIG. 1 shows a schematic diagram of a value based benefits system according to an exemplary embodiment.

Reference will now be made in detail to the preferred embodiments of the present invention, examples of which are illustrated in the accompanying drawings.

A value based benefits (VBB) program can be employed using the various methods and systems described herein. The VBB program extends beyond conventional health and wellness program management to allow health plans to customize benefits and incentive programs to meet the needs of individual members based upon their health status, chronic conditions, and health and wellness activity. The VBB solution enables a claims processing solution that can adjust the member's out-of-pocket expenses for specific services based on an assessment of the clinical benefit achieved. The VBB program recognizes that the levels of evidence and resultant values of various clinical services differ and the value of any specific intervention varies across member groups.

The VBB program can provide a platform for health plans to establish and manage a flexible set of benefit and incentive programs to reward members for qualifying health and wellness activities. A member reward may be enhanced benefits for a type of service to remove financial barriers to obtaining effective care when claims are adjudicated for specific diagnoses or procedures. An incentive program may be structured to provide rewards to members who engage in health and wellness improvement activities and programs. Programs may also be structured to enable members to earn rewards for participating in specific conditions or disease programs to help them manage their conditions. Examples of incentive programs targeting health and wellness activities include, but are not limited to, completing a health risk assessment, participating in a smoking cessation program and testing out smoke free, and reducing a BMI (body mass index) to a healthy level.

An incentive program may also be structured to positively impact members with chronic diseases, such as heart disease, asthma, diabetes, and hypertension. An exemplary program may require the completion of an educational program; demonstrated proof that member has refilled maintenance medications as recommended; and participation in a disease management program if the plan contacts the member and determines that the member may benefit. As the member completes these activities, they may earn various rewards as configured by the payer.

The methods and systems described herein involve various entities, each of which can be a single person, a group of people, a business, or any other representative group. Although the entities are described as being separate, it is understood that two or more entities may be combined or consolidated into a single entity. Exemplary entities have been described below, though it is also intended that these entities may be substituted with other entities, and some of these entities may not be necessary for the implementation of the methods and systems.

A payer can be a health insurance company, such as Blue Cross and Blue Shield, Providence, United Health Care, and Humana. The payer can manage and offer various health insurance plans to employers or directly to individuals, or the payer may administer a medical plan on behalf of a self-insured group. The payer typically has customer service representatives for interfacing with the member or employer to manage the plan and address member questions.

The health insurance plan is also known as a health plan or may be referred to as a medical product or medical plan. A medical plan may include coverage for vision, or vision may be a separate rider. Dental coverage is typically a separate plan or product. A payer builds a medical plan with service rules that control how each line item on a claim is paid. Factors evaluated during claim adjudication include: deductibles that may apply, the determination of the allowed amount for each service (claim line item), the amount that is the member responsibility (co-insurance or co-payment), and the amount that the payer is responsible for paying the provider. There are many factors that are included in the creation of service rules, such as diagnosis codes, procedure codes, revenue codes, provider type, provider specialty, provider network affiliation, and the presence of any other medical coverage (such as a spouse's plan). The health plan itself does not need to be modified to work with the systems and methods described herein.

A subscriber is the individual who is primary on the insurance with the payer. An employee of a company who elects to use the health insurance plan offered by the company is considered a subscriber. Any family member covered by that employee is a dependent and is linked to that subscriber. Each unique person covered by the health insurance plan is referred to as a member. As a result, the use of the term "member" herein can be used to describe any entity that is covered by the health insurance plan regardless of whether they incur any medical claims during the period of coverage.

A program vendor is an entity that provides incentive program services. For example, the program vendor can be a smoking cessation program that encourages and assists entities to quit smoking. In other examples, a program vendor may be an organization providing a weight loss program or an organization providing a web-based education program for diabetics. The program vendor may be a private organization, a local hospital, a disease management firm, or may be the payer themselves if they have a division within their organization that provides the service.

A pharmacy benefit manager (PBM) is an entity that manages a prescription drug program for a payer. The PBM is an administrator of prescription drug programs, maintains the information on formularies, maintains pharmacy provider networks, and processes and pays prescription drug claims.

A rewards vendor is an entity that provides a reward associated with the incentive program. The rewards vendor may be the insurance company (payer) and the reward may be enhanced benefits or a contribution to a health care account that the payer administers such as a Health Reimbursement Account. The rewards vendor can also be an entity that sells products or services to consumers. In another example, the rewards vendor can be an entity, such as Automatic Data Processing (ADP), that can implement a reduction in a member's contribution to a premium payment, like a ten percent reduction in the member's contribution to the premium.

A payroll system can be managed by an entity that can be integrated in an employing company of the member or it can be a separate company, such as ADP. Payroll provides payroll services for paying the member or subscriber.

A claims processing system, such as FACETS or QNXT offered by the TriZetto Group, Inc., provides processing of claims and maintains information about member eligibility. The claims processing system stores member-specific data, group-specific data, plan details, provider data, and provider reimbursement data.

Referring to FIG. 1, a schematic diagram of a value based benefits system is shown. A VBB manager 100 enables overall management of incentive programs. The VBB manager 100 stores and executes business rules, manages communication between all related participating systems, and stores incentive-specific details for all enrolled members. The VBB manager 100 can implement business rules against requests received from various entities and route the requests to the appropriate entity with any information from a different source that can expedite or be useful in the processing of that request. The rules can relate to eligibility and/or program rewards, and can be customized by the payer as the incentive programs are created.

The VBB manager can store incentive plan details; route communications with other systems, such as a claims processing system; and route messages to the rewards vendor and program vendor. The VBB manager 100 can be a software module executed by a server, and the server can be communicatively coupled with one or more databases. The VBB manager 100 can communicate with various entities through a communication network such as the internet, World Wide Web, local area network, wide area network, or the like.

Figure 2:
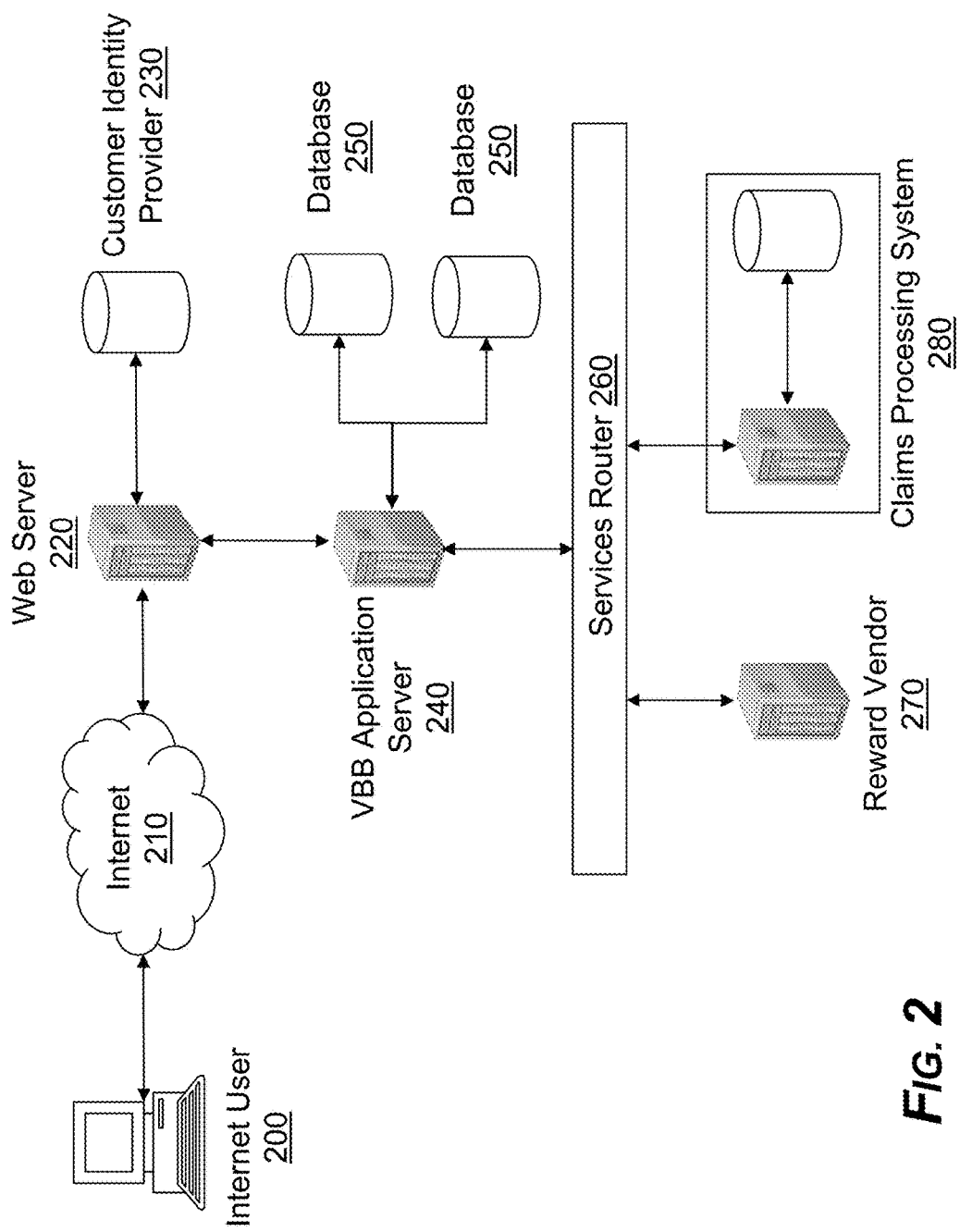
FIG. 2 shows a system architecture according to an exemplary embodiment.

Referring to FIG. 2, an exemplary VBB system architecture is shown. An internet user 200, such as a member using a member web app on a personal computer, can access a web server 220 via a network 210, such as the internet. The web server 220 can also provide the services to execute a member web app. The web server 220 can communicate with a customer identity provider 230, such as an LDAP server for authentication. Upon confirming the identity of the internet user 200, a request from the internet user 200 can be directed to a VBB application server 240.

The VBB application server 240 executes a VBB manager and can access one or more databases 250, such as a SQL server. Whereas a claims processing system (e.g., FACETS) can maintain member-specific data for claims processing, the databases 250 may maintain only incentive-specific data about members in the programs. One of the databases 250 can be used to store data for all members who participate in incentive programs, including member ID, information on the three tier hierarchy (e.g., group, class, plan), information selected by the member (e.g., do not contact flags), any HIPAA flags to ensure a subscriber does not see any dependent information that the subscriber is not entitled to see, and incentive program information. The incentive program information includes, but is not limited to, date enrolled, date dis-enrolled (if applicable), dates for all complete levels (if more than just 100%), date program complete, vendor program name and reference information, member enrollment information if the member enrolled on a member web app and including the date enrollment information was sent to the program vendor, the date the reward information was sent to the reward vendor, and the rewards earned.

The VBB application server 240 can communicate with other servers and databases through a services router 260. For example, the VBB application server can communicate with a rewards vendor 270 and a claims processing system 280.

Referring back to FIG. 1, the VBB manager 100 can receive or transmit messages to a payer web application (app) 110. The payer web app 110 can be used by the payer for program configuration, maintenance, and member management. The payer can configure details regarding various incentive programs and program vendors, as well as various reward details, such as reward amount and type. The payer can also manage the members participating in programs and log the participation and enrollment for compliance purposes. The payer can manage program eligibility, tie programs to groups of members, communicate with third party vendors, and provide information for customer service representatives. The payer web app 110 can be accessed on a personal computer or other specially configured processing device with network access to the VBB manager 100. Additionally, the servers and/or databases of the payer can communicate with the server of VBB manager 100 through a communication network.

The payer will use the claims processing system (e.g., FACETS/QNXT) to build enhanced benefit service rules that vary by qualifier to enable a member who has completed an incentive program to have a reward of a higher level of benefit for claims meeting the qualifier criteria. These rules apply at a claim line item level. Examples of qualifiers include, but are not limited to, claim type and sub-type, place of service, procedure code (e.g., CPT or ICD), revenue code, diagnosis code, provider type, provider specialty, network affiliation, service performed by primary care physician, primary drug benefit, secondary drug benefit, member's age, member's gender, and eligibility based on class, plan, product type, and product category. The new enhanced benefit has a rule ID associated with it. When the payer using the payer web app 110 designs an incentive program and selects an enhanced benefit as an incentive program, the payer will see via a real-time submission to the claims processing system, a list of all of the available enhanced benefit rules. The payer selects the rule to apply to the specific incentive program.

Figure 3A:
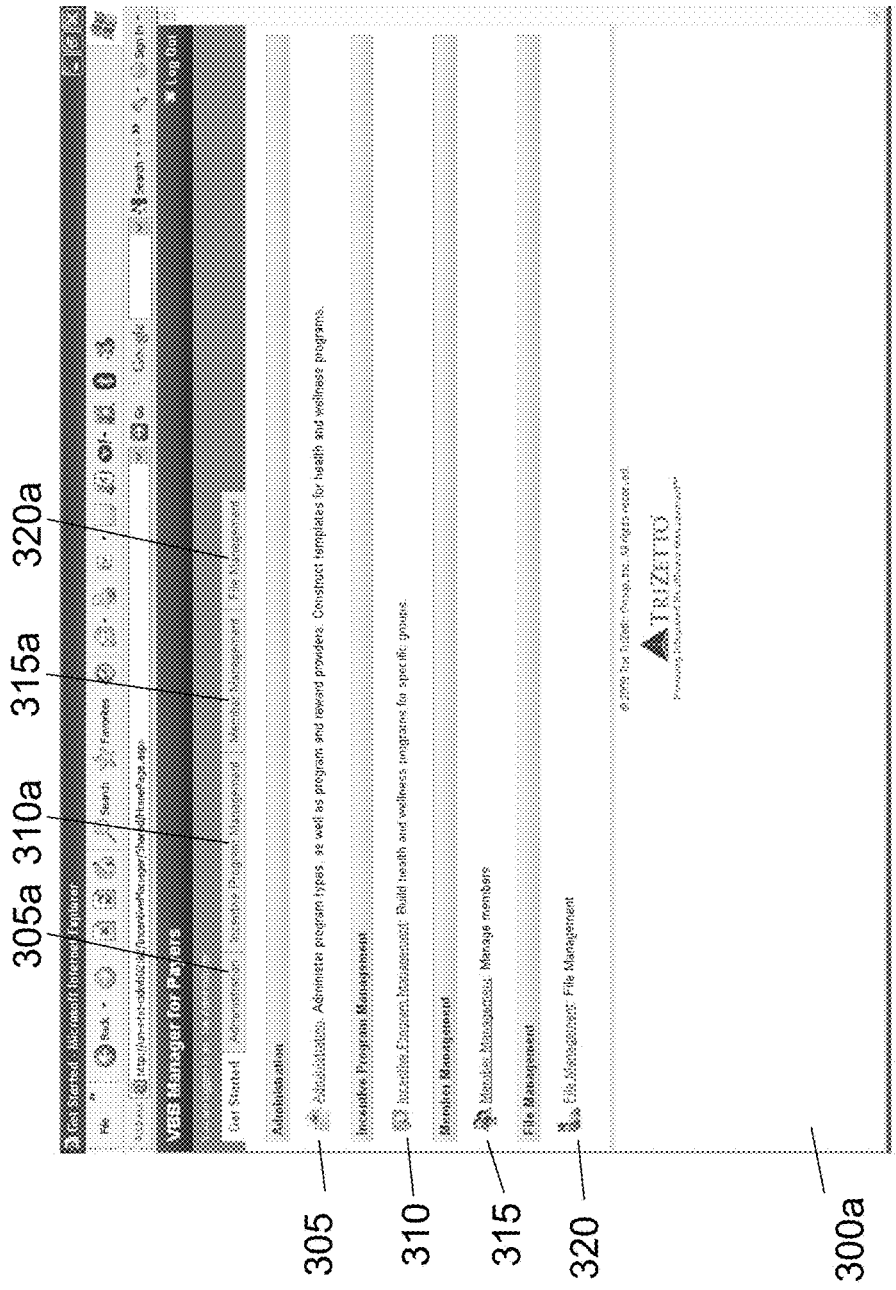

Referring to FIG. 3a, a screenshot 300a of a payer web app is shown. The payer web app allows the payer to set up and manage incentive programs, build rules, and track member compliance. In this exemplary embodiment, an initial display 300 presents options in the forms of links for "Administration" 305, "Incentive Program Management" 310, "Member Management" 315, and "File Management" 320. Administration 305 allows the payer to administer program types, as well as program and reward providers. The payer can also construct templates for health and wellness programs. Incentive Program Management 310 allows the payer to build health and wellness programs for specific groups. Member Management 315 allows the payer to manage members either at the individual level or for a group of members. File Management 320 allows the payer to manage files if they are used as a way to communicate with program vendors or reward vendors. The screen 300 also has a tab for each of Administration 305a, Incentive Program Management 310a, Member Management 315a, and File Management 320a.

Figure 3B:
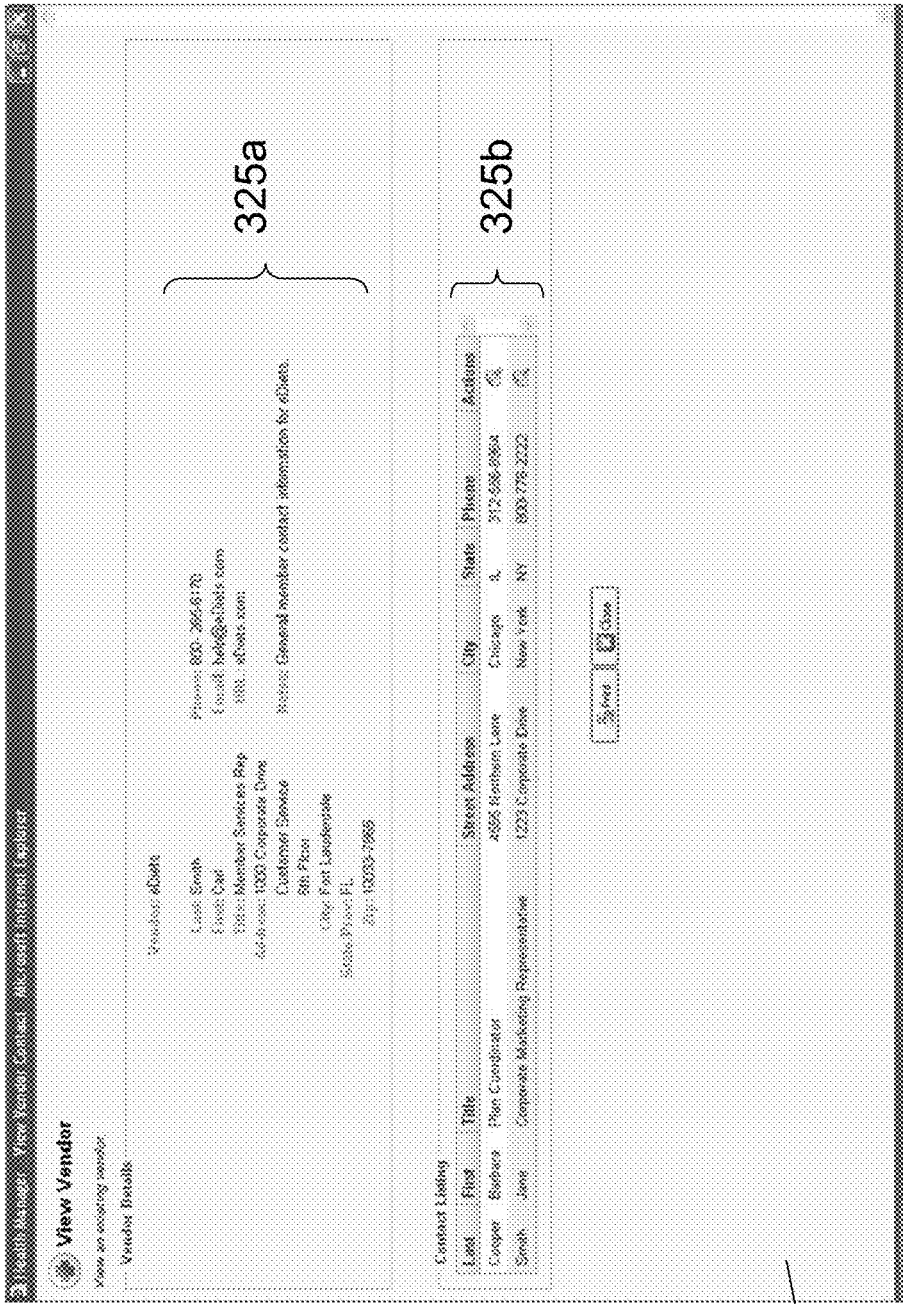

Referring to FIG. 3b, an Administration screenshot 300b is shown for viewing details of an existing vendor. The screen 300b is used as a central place to store and then display details 325a such as the name of the vendor, address, telephone number, e-mail address, website address, and notes. The screen 300b also allows for entry and storage and display a list of contacts 325b for the selected vendor.

Figure 3C:
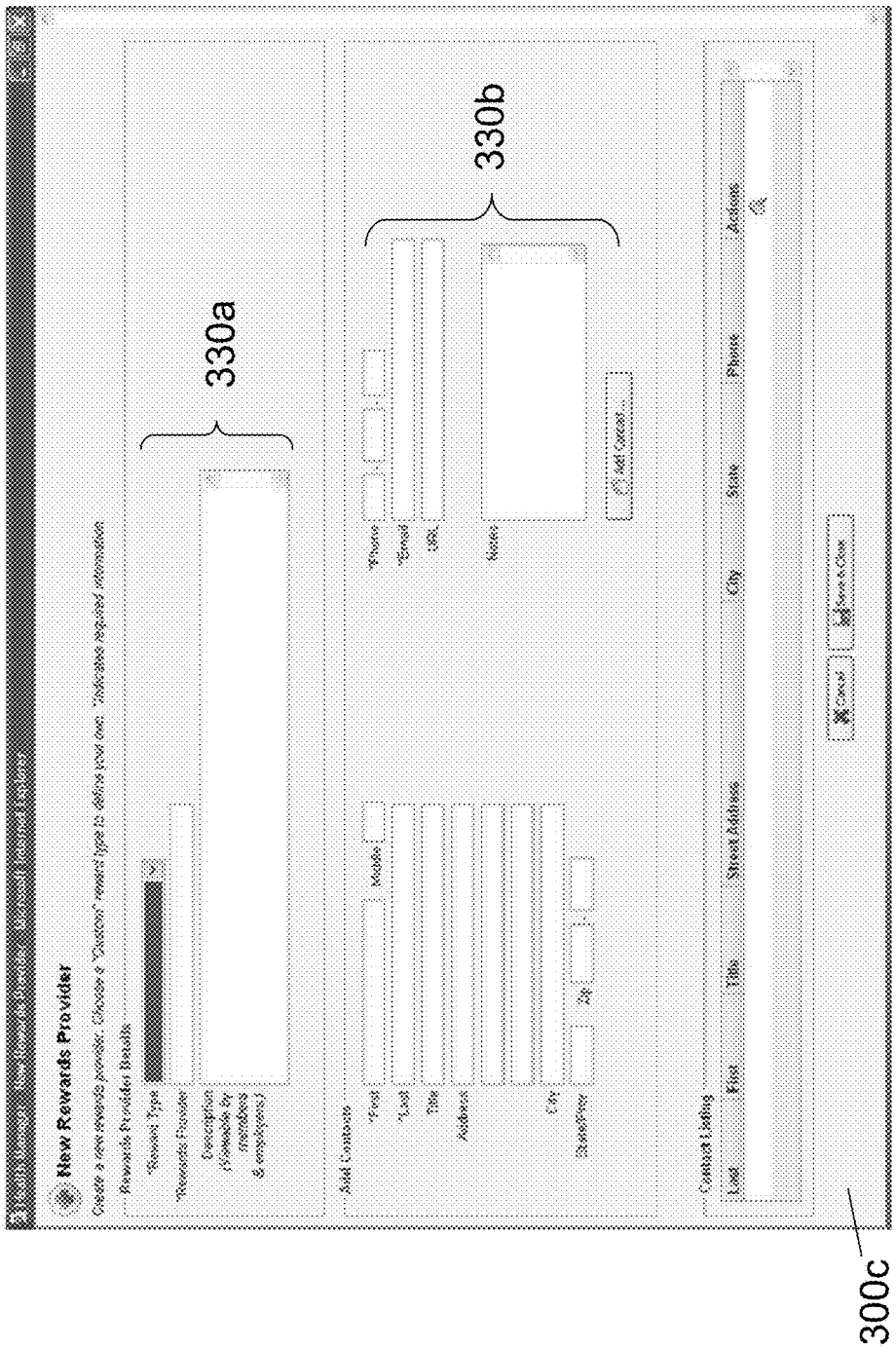

Referring to FIG. 3c, an Administration screenshot 300c is shown for adding a new reward vendor. The payer can enter information 330a including the reward type, the name of the reward vendor, a description of the reward to be viewable by members and employers, and contact information 330b.

Figure 3D:
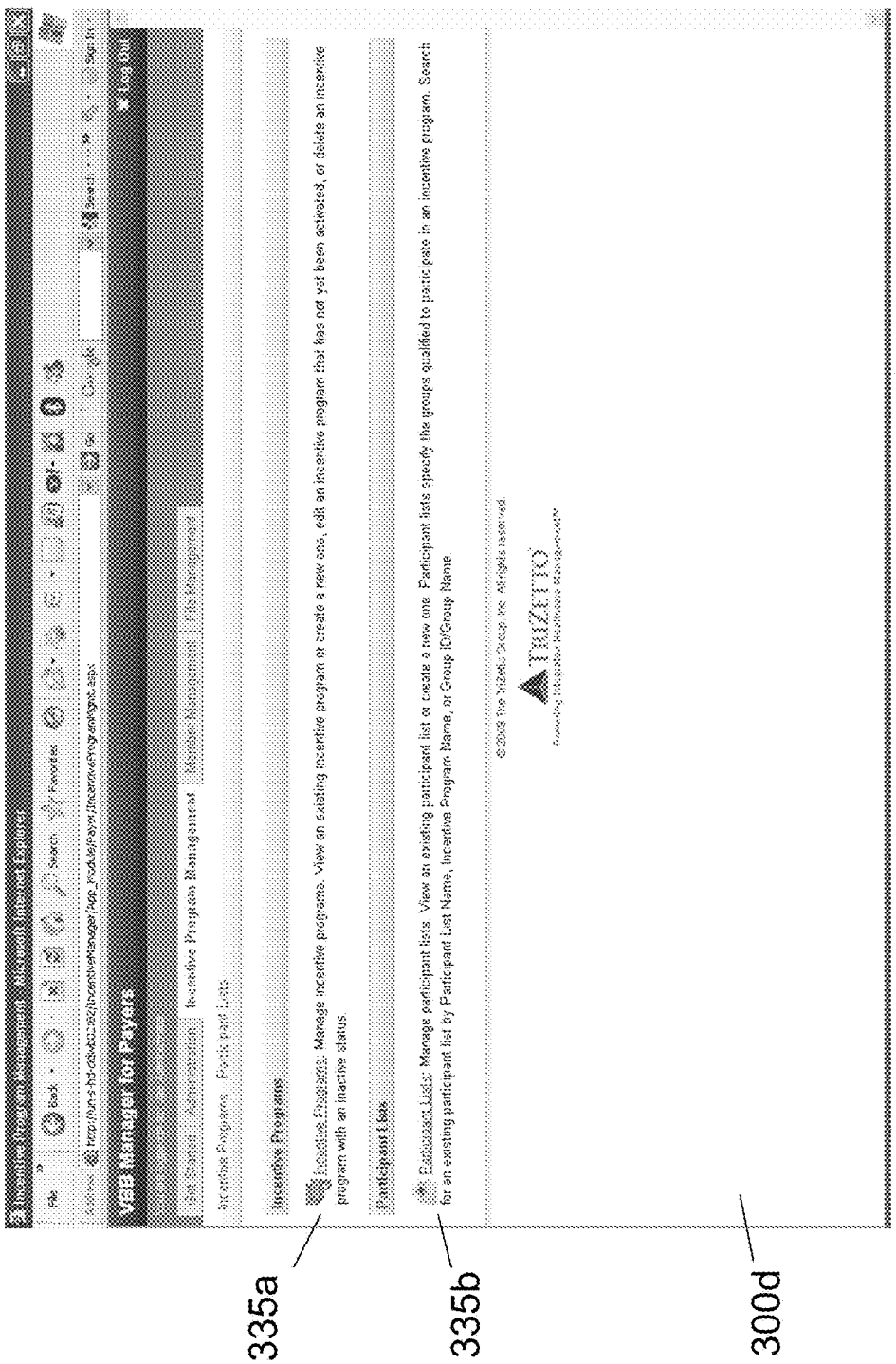

Referring to FIG. 3d, an Incentive Program Management screenshot 300d is shown view managing incentive programs 335a and/or managing participant lists 335b. A participant list is a group of groups that is participating in an incentive program. A large number of groups can be associated with an incentive plan. Each group has a three-level hierarchy consisting of a group, class, and a plan. A claims processing system can provide lists of groups, class, and plans in real-time. Other data can be imported or new services can be built.

Incentive programs can be based on a three level hierarchy using the group, class, and plan. For example, level one is the group, such as Joe's Trucking. Level two is the class, such as hourly, salaried, or executive. Level three is the plan, such as PPO1, PPO2, or HMO. Each employee has an explicit relationship with each of the three levels. Groups may be very complex and contain many classes as well as a wide variation in plans by class, whereas other groups may be very simple. This hierarchy allows the VBB manager to leverage the eligibility and plan configuration that exists with the claims processing system. Similarly, the reward vendor can allow different member choices of rewards based on the class of member, e.g., executives versus non-executives. If a member moves from one group to another, the VBB manager can access that change because all eligibility information that includes a member's group/class/plan is accessed in real-time from the VBB system, which is the source of truth for eligibility data. All data is fully accurate and up-to-date because it is not replicated.

Figure 3E:
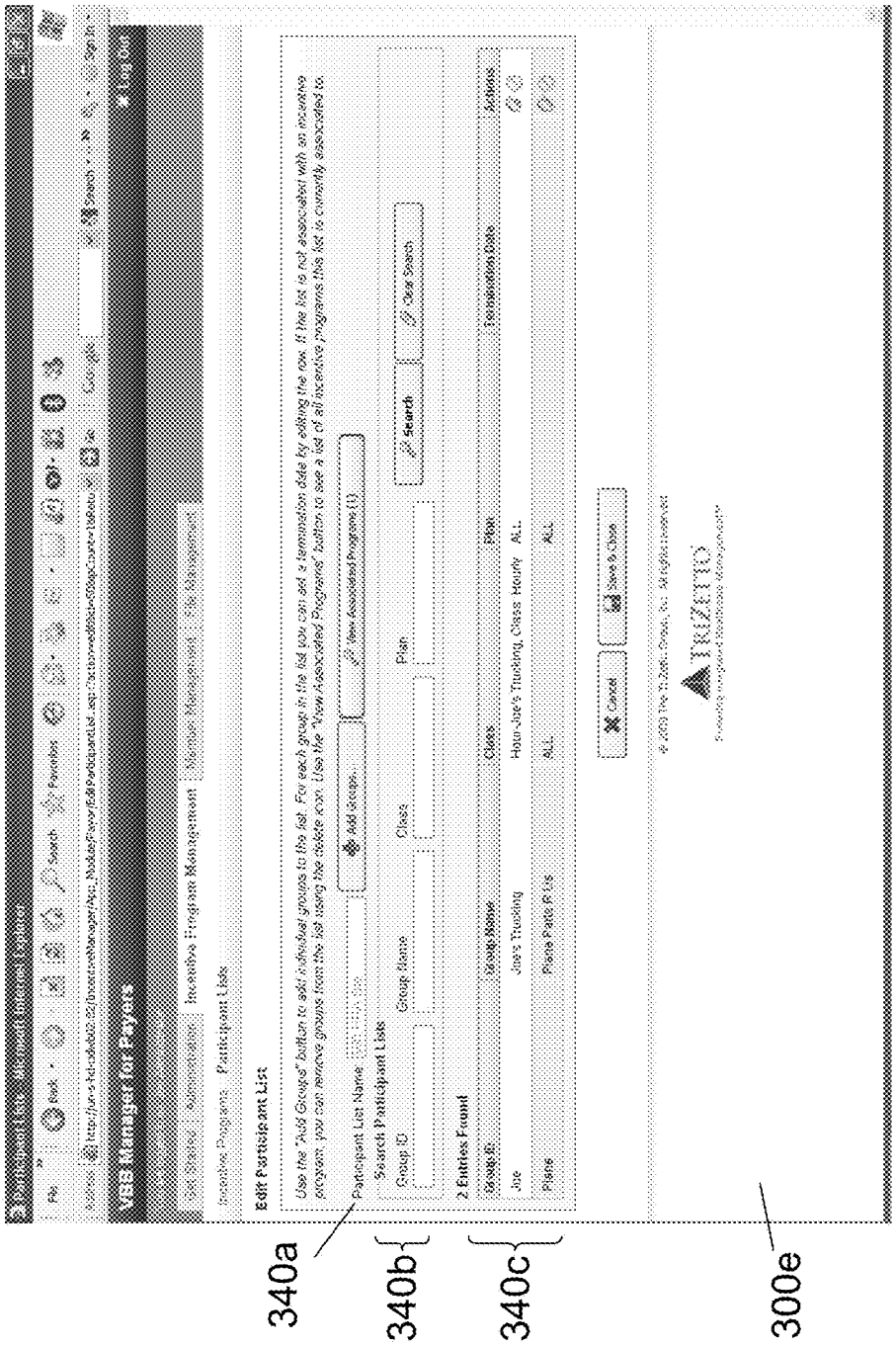
Figure 3F:
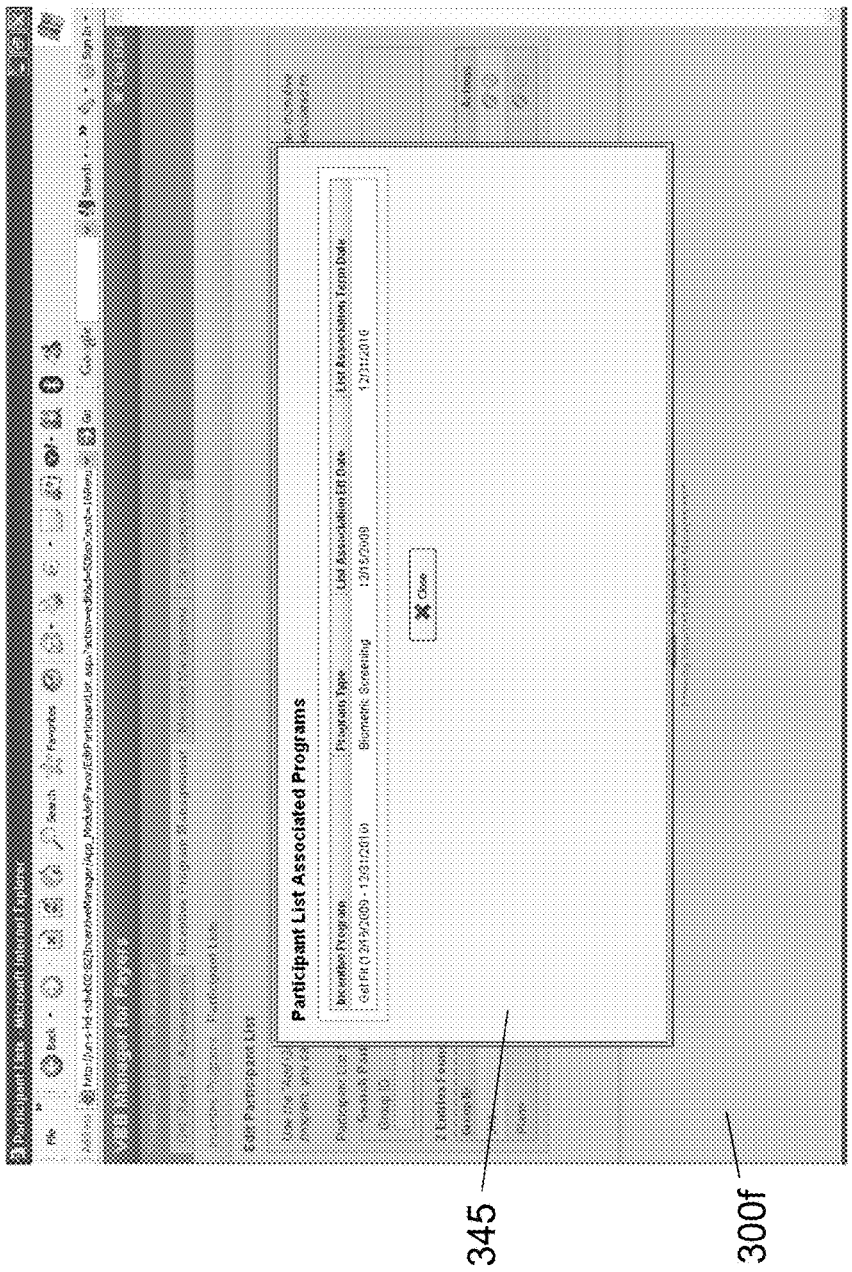

Referring to FIG. 3e, an Incentive Program Management screenshot 300e is shown for editing a participant list. The payer can enter a participant list name 340a or search for a group ID, group name, class, or plan in participant lists 340b. The searching capability will enable the user to access the group structures that are in the VBB system via a real-time submission to that system. The payer can choose to edit the results 340c of the search. Once a participant list has been identified, the payer can view programs associated with the participant list, as shown in the window 345 on the screenshot 300f of FIG. 3f.

Figure 3G:
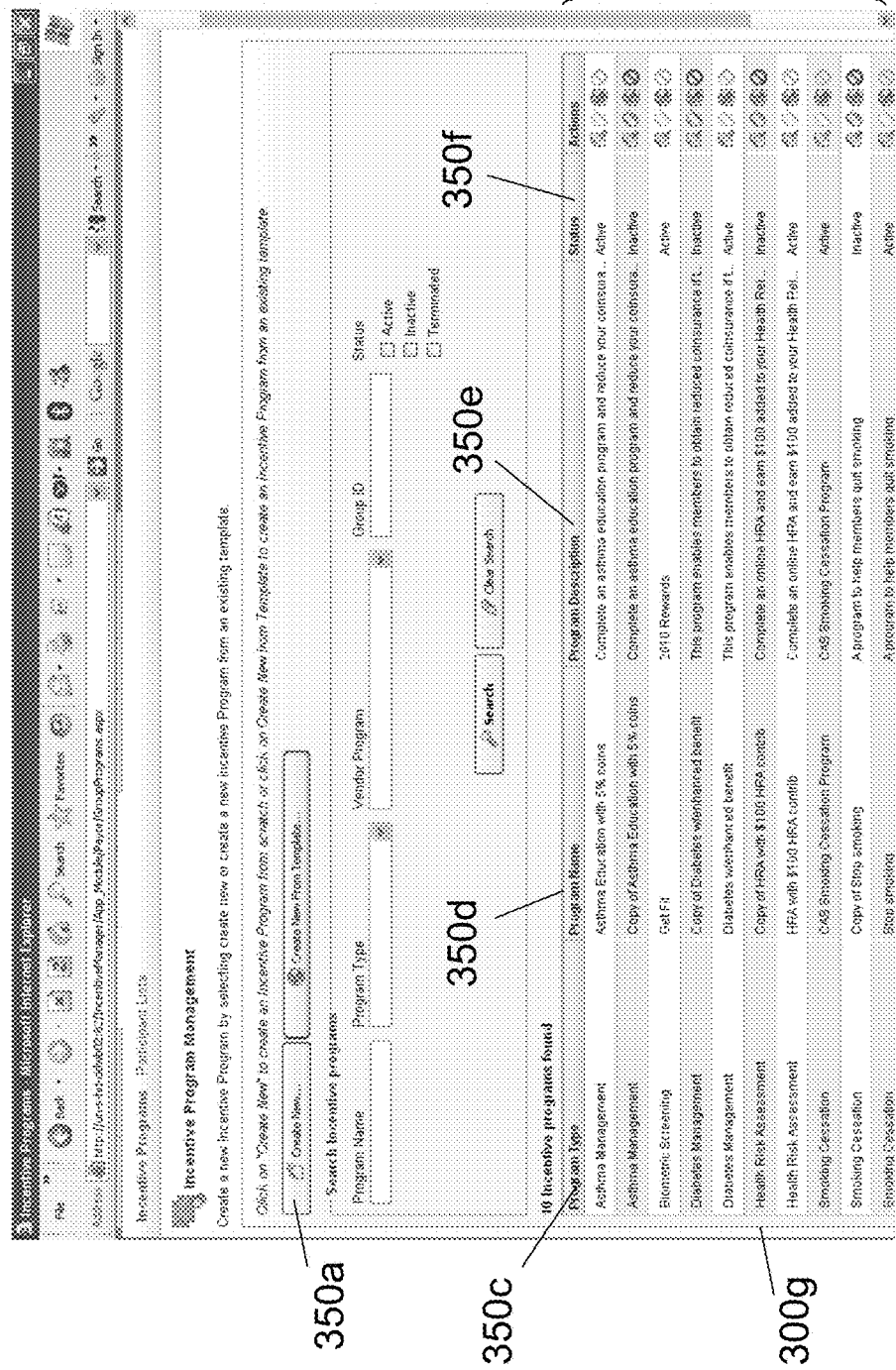

The payer can use the Incentive Program Management to view, edit, or copy existing programs or create new programs. Referring to FIG. 3g, a screenshot 300g is shown for creating a new incentive program. The payer can select "Create New" 350a to create a brand new program. If a similar program exists, the payer can select the existing incentive program and copy the program. Each existing program 350b can be associated with a program type 350c (e.g., asthma management, biometric screening, diabetes management, health risk assessment, and smoking cessation) for categorizing the existing programs. Search results can also display a program name 350*d*, program description 350*e*, and the current status 350*f* of the program.

Figure 3H:
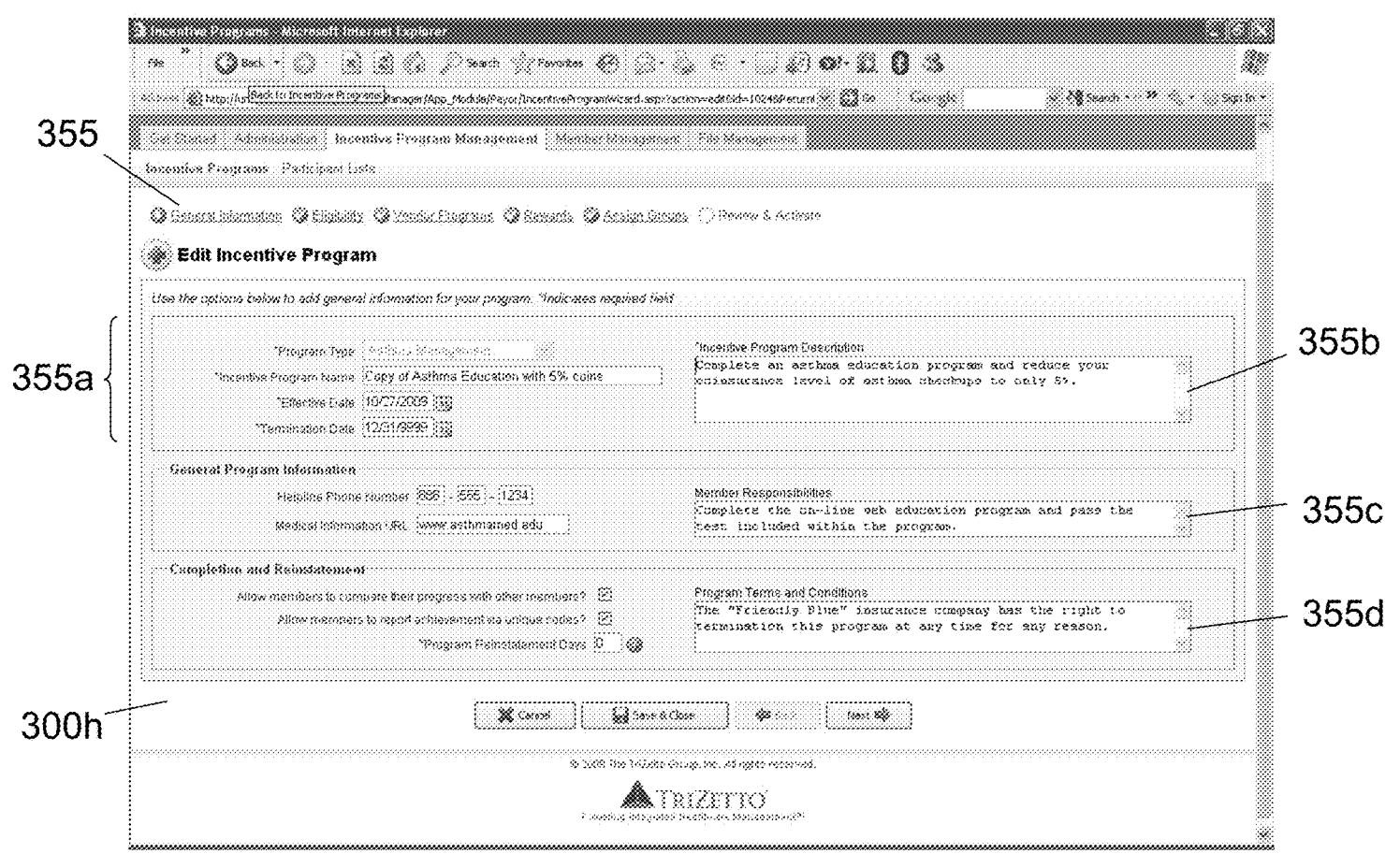

The payer can edit the inventive program, as shown in the screenshot 300*h* of FIG. 3*h*. The payer can use this exemplary form to enter or edit general information 355. Besides editing information 355*a* about the name and dates of the program, the payer can also edit information regarding an incentive program description 355*b*, member responsibilities 355*c*, and program terms and conditions 355*d*.

Figure 3I:
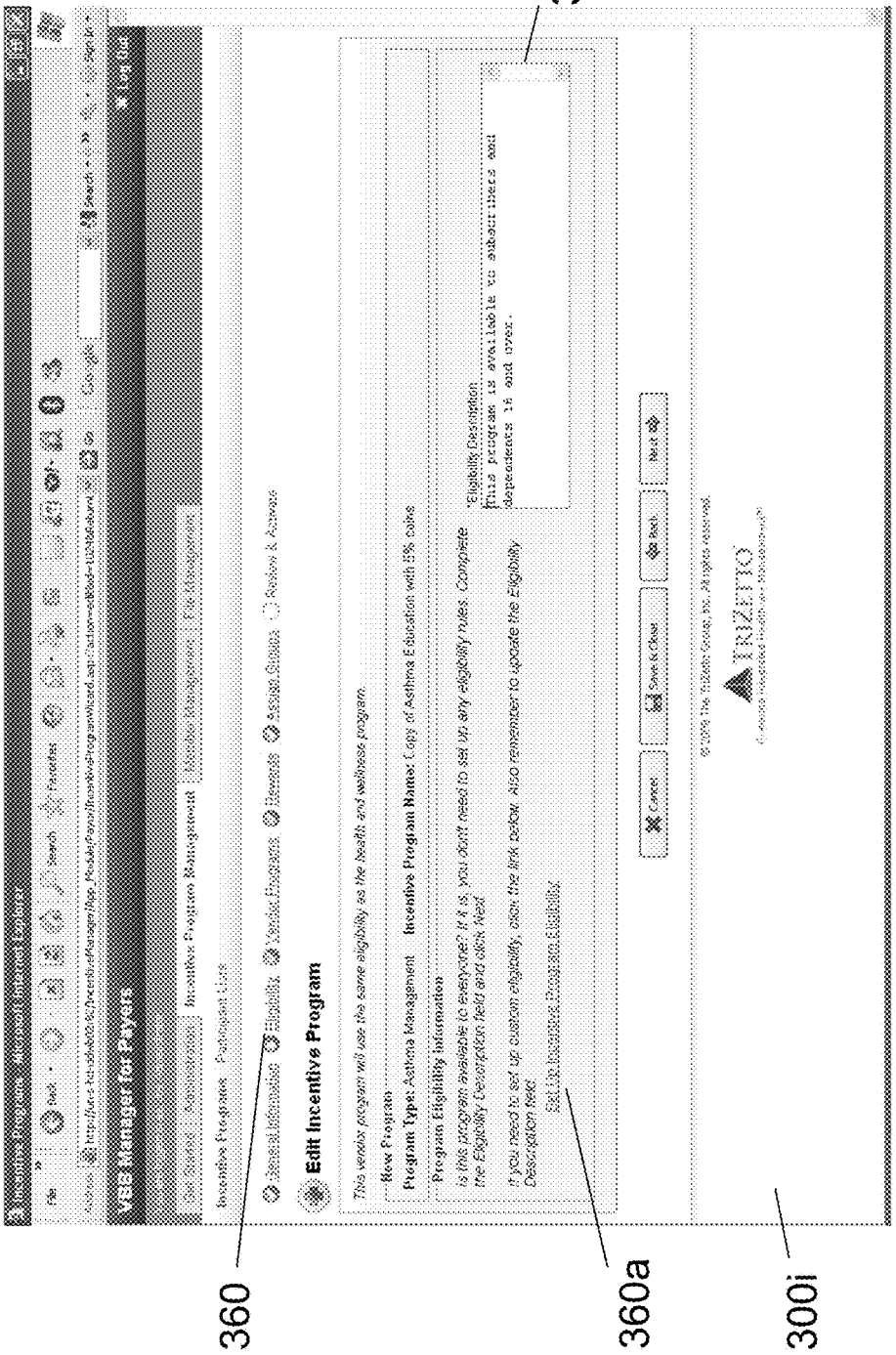

Referring to FIG. 3*i*, a screenshot 300*i* is shown for allowing the payer to edit eligibility information 360. The payer can follow a link 360*a* to set up incentive program eligibility and can enter an eligibility description 360*b*. A rules engine allows the payer to define eligibility at the member or subscriber level, or based on age, sex, or other customizable criteria. This eligibility is based upon who may participate, not the requirements for the reward.

Figure 3J:
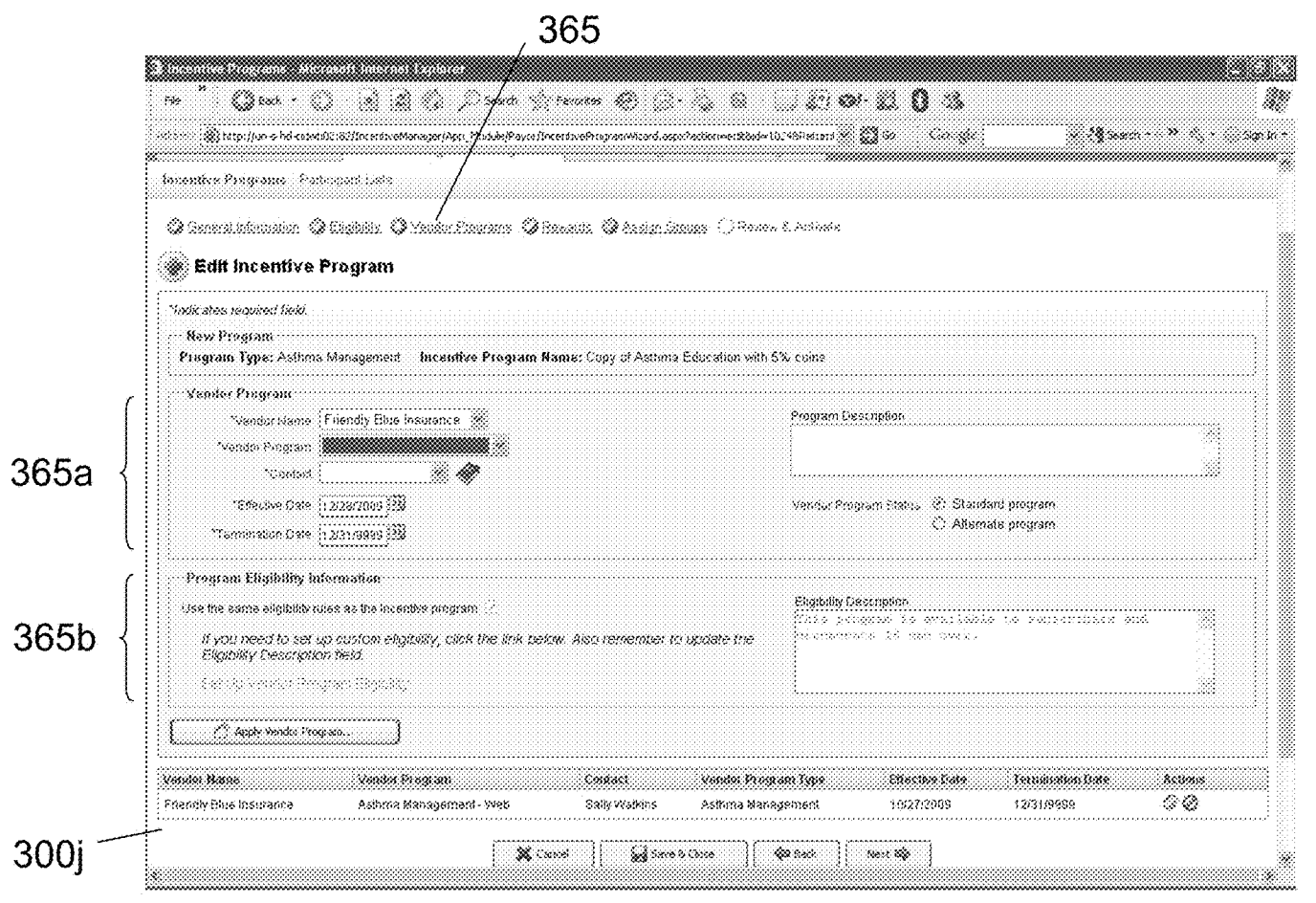

Referring to FIG. 3*j*, the payer can define an incentive program vendor 365 as shown in screenshot 300*j*. The payer can enter or change information 365*a* regarding the vendor's name, program, contact, effective date, termination date, and a program description. The payer can also edit eligibility rules 365*b* based on the rules in the incentive program. The program vendor can be an external party, such as Weight Watchers or a local community hospital program, or the program vendor can be internal, such as a program offered by the payer. The eligibility for a program vendor can be different than the eligibility of the program as a whole, e.g., a vendor may only work with women, though both genders may be eligible for a weight management program. The payer can choose from more than one vendor for a program as a way to serve a geographically diverse population or to give program choices to members.

Figure 3K:
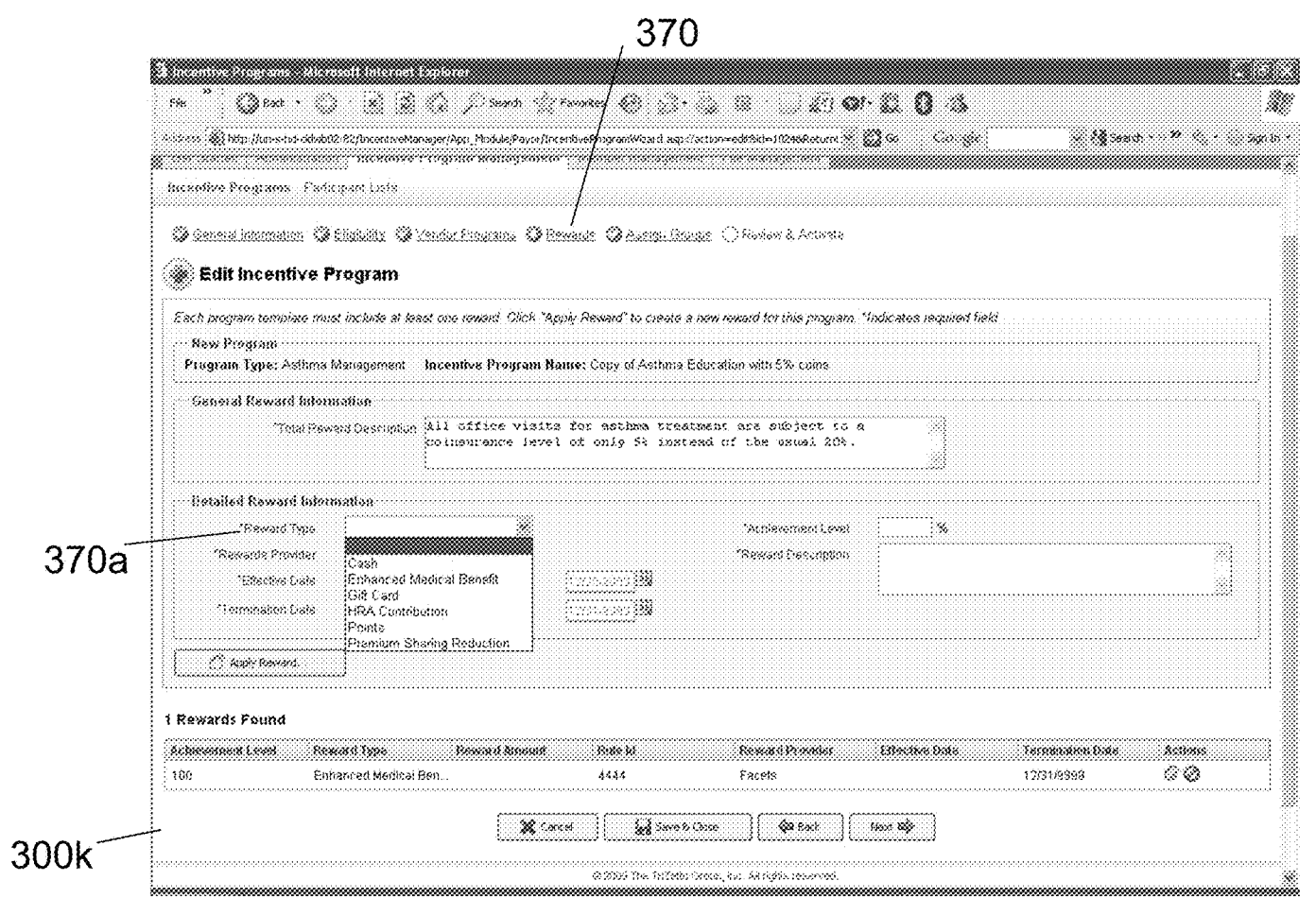

The payer can define a reward 370 for the program, as shown in a screenshot 300*k* of FIG. 3*k*. The VBB program can support various reward types, including cash, enhanced medical benefits (which can be implemented using the claims processing system), gift cards (which can be implemented using a reward vendor), Health Reimbursement Account (HRA) contributions (which can be implemented using the claims processing system administering the HRA), point banks (which can be implemented using a reward vendor), and premium sharing reductions.

Rewards can be something small and immediate, or the rewards can be a longer term benefit enhancement. Immediate rewards can include Health Reimbursement Account (HRA) contributions, points for a point bank or gift cards, or cash. In one example, a member can earn a reward and a message is sent to the VBB program, which makes a HRA allocation and all HRA claims are eligible for payment from the increased allocation. If the HRA account is administered by a claims processing system that is integrated with the system described herein, then the contribution to the HRA account can be automated. Otherwise, the claims processing system may require a file or web service. Likewise, a contribution can also be made to a health savings account (HSA), and the contribution information can be made available to a HSA administrator. When the reward is cash, the VBB manager can provide a file or web service with the payment information to a payroll system. When the reward is a premium sharing reduction, the VBB manager can provide a file or web service with the data on the new premium sharing amounts to the payroll system. When the reward is points in a point bank, the member may redeem the points or allow the points to accumulate in the point bank for later redemption. The points can be redeemed from the reward vendor for services, merchandise, or gift cards available from the reward vendor or another third party vendor. When the reward is a gift card, the reward vendor can offer a gift card upon completion of a task by the member. The member will receive notification, by the VBB manager or the reward vendor, of the amount that is available and the member can redeem that value for a gift card at the merchant of their choice.

Longer term benefit rewards include reduced co-pay for medications and/or reductions in out-of-pocket costs for office visits for maintenance checkups. When the reward is an enhanced medical benefit, the member can be flagged within the claims processing system as eligible for an enhanced benefit (e.g., a lower co-pay for coinsurance for claims for diabetes) and the claims processing system will apply that new benefit to that member. When the reward is an enhanced medical pharmacy benefit, the VBB manager can provide a file or web service directly to the PBM indicating which members are eligible for an enhanced pharmacy benefit (e.g., lower co-pay).

In one embodiment, the payer can reward members for 100% completion of a task or for partial completion of the task. For example, if an incentive program involves rewarding a member for losing 25% of their weigh goal with a reward, they may receive a reward for partial completion so that the member does not have to wait until reaching the full target weight before receiving a reward.

When implementing the claims processing system into the VBB program, a parent can log in and complete an activity on behalf of the child, and the child can earn the reward. This arrangement can be particularly helpful for childhood diseases where a payer wants a parent to enroll in an education course on behalf of the child, who is likely to young to participate, and then receive enhanced benefits for maintenance care.

The payer's choice of a reward can dictate the details that the payer must then provide to support that particular reward type. As shown in FIG. 3*k*, the payer selects a reward type 370*a*. In this example, the available reward types are shown in a drop-down menu and can include cash, enhanced medical benefit, gift card, HRA contribution, points, and premium sharing reduction.

Referring to FIG. 3*l*, a screenshot 300*l* is shown whereby the payer has selected points as the reward type 370*a*. The payer can also enter information 370*b* regarding the reward vendor, effective date, termination date, number of points, expiration grace period, achievement level, and a reward description.

Figure 3M:
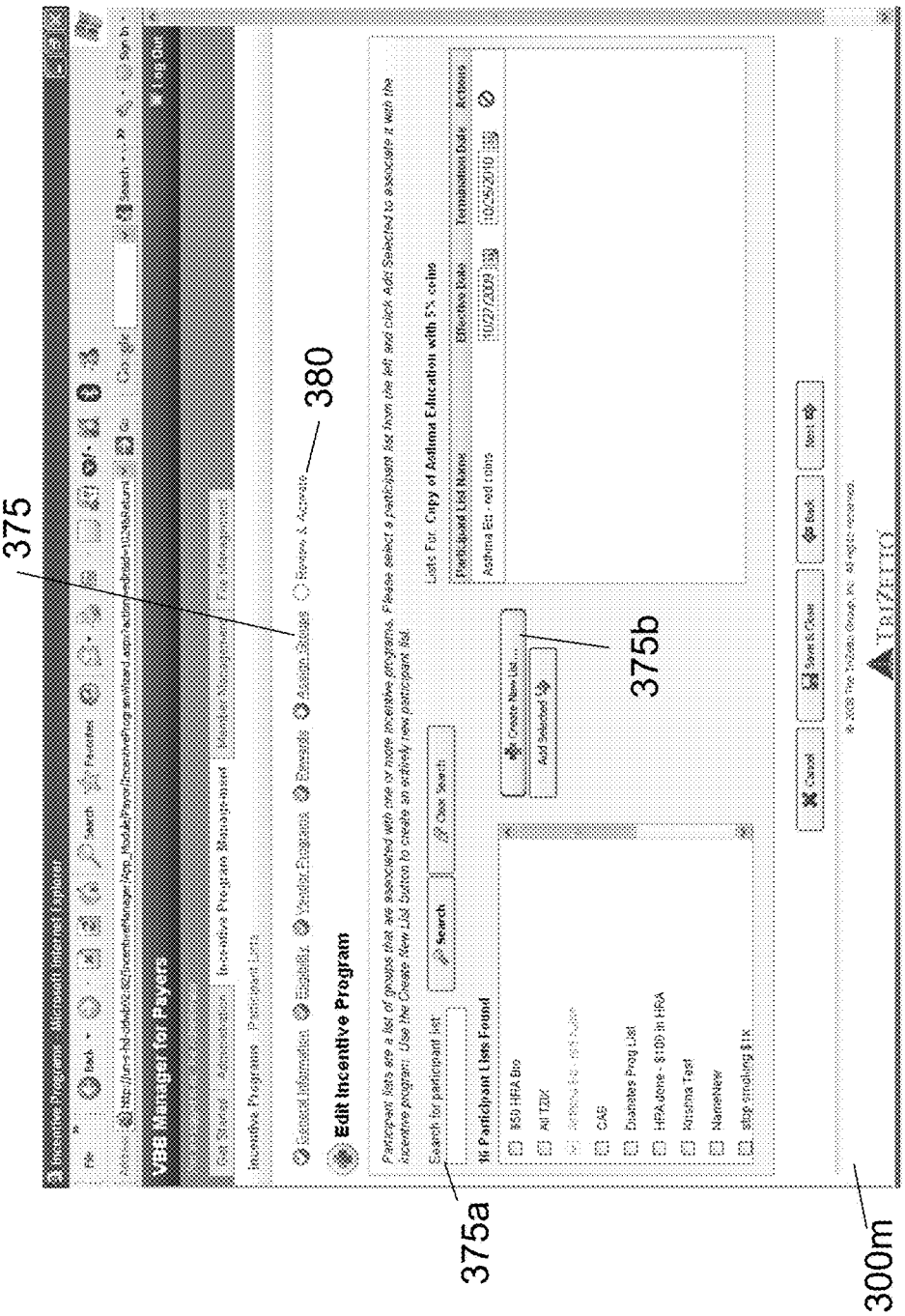

The payer can assign participant lists or member groups 375 to associate with this incentive program, as shown in screenshot 300*m* of FIG. 3*m*. The payer can list a group of groups to whom the benefit will apply. The incentive program can be associated with one or more groups. The participant list can include a group, class, and a plan. For example, the group can be Joe's Trucking, the class can be hourly employees, and the plan can be PPO Plan A. In this screenshot 300*m*, the payer can search for participant lists 375*a* and create new lists 375*b*.

The payer can then review and activate 380 the incentive program once the required steps have been completed. If the reward is a points program, then the information from the activated program is then transmitted to the reward vendor for the members who earn a reward. The reward vendor will know how many points to assign the member for completing a specific task associated with a particular incentive program.

A payer can also use the payer web app to manage members participating in incentive programs. The payer can manage one member at a time or multiple members at the same time. Additionally, a customer service representative of the payer can use the payer web app to manage and assist members via a telephone call.

Figure 4A:
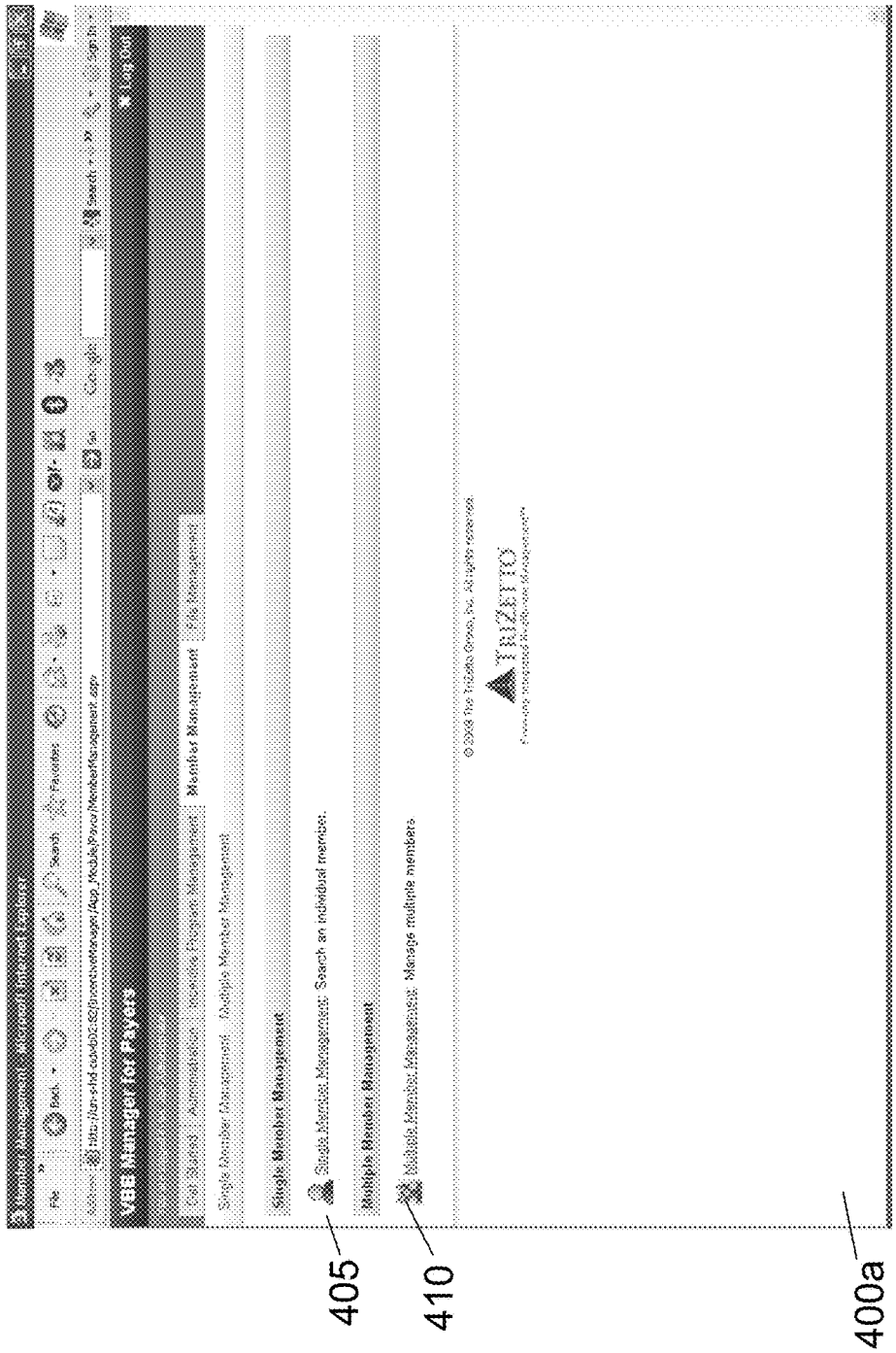

Referring to FIG. 4a, a screenshot 400a for managing members is shown. A payer can choose a link for single member management 405 to search for an individual member or choose a link for multiple member management 410.

Figure 4B:
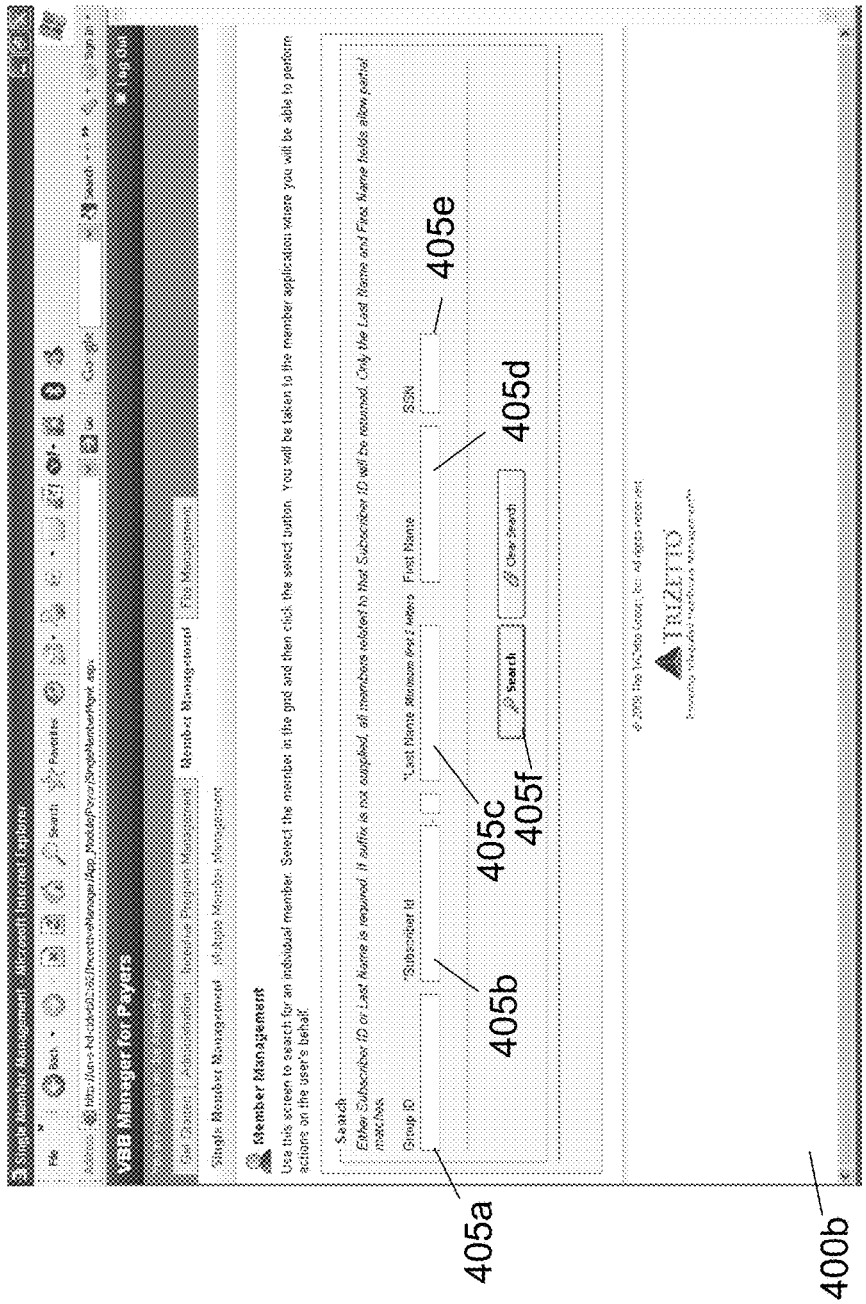

Referring to FIG. 4b, a screenshot 400b for searching for an individual member is shown. The payer can enter the group ID 405a, subscriber ID 405b, last name 405c, first name 405d, and/or social security number 405e to conduct a search 405f. The payer can search for a member using a web service and obtain the results substantially in real-time. When a member's information is returned, the payer (e.g., the customer service representative) can see all of the details of the member's experience as the member would see the information to help serve the member better. In some instances, the payer may also see additional information to assist with the member.

Figure 4C:
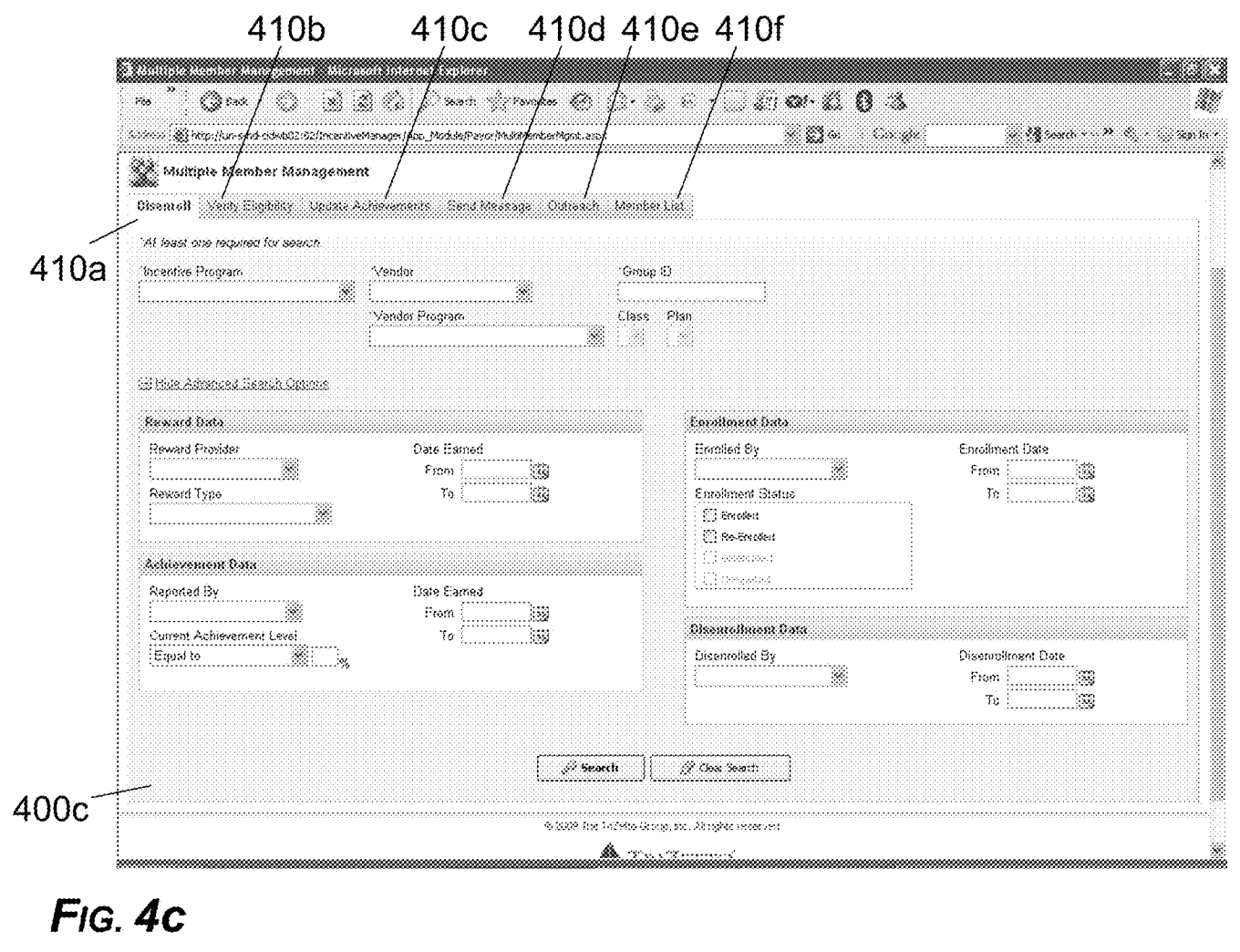

Referring to FIG. 4c, a screenshot 400c for searching for multiple members is shown. The payer can select options for management include dis-enroll 410a, verify eligibility 410b, update achievements 410c, send message 410d, outreach 410e, and member list 410f. The payer can search for members or groups. Searching for multiple members can take longer than a search for individual members, so a status can be reported on a dashboard on the user interface. As a result, the payer can request that many members (e.g., 10,000) be automatically dis-enrolled from a program and not wait until the process is complete. Instead, the process will run and the payer can log back in, assess the job status, and identify any issues or errors that may then be addressed.

Figure 5A:
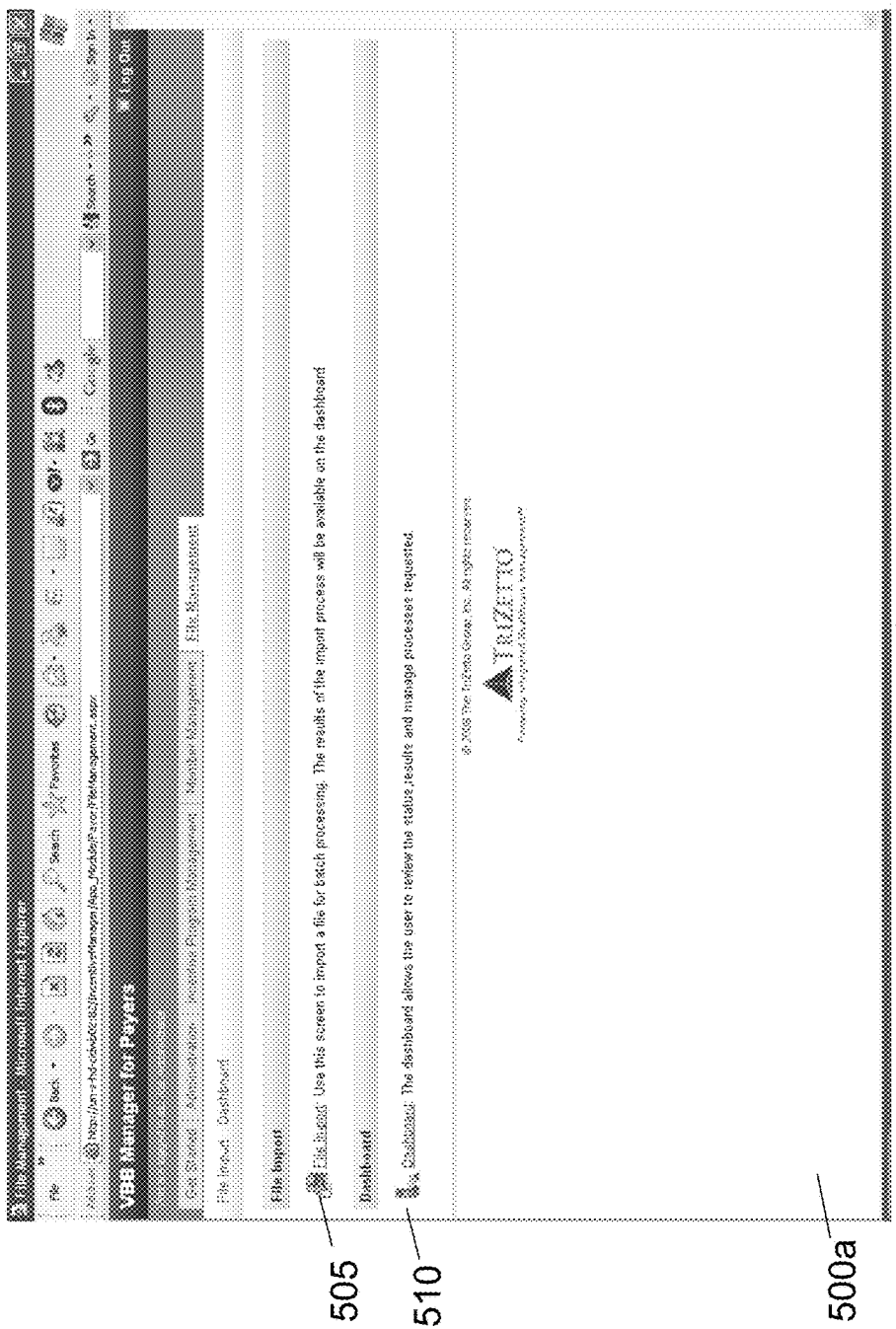
FIGS. 5a to 5c show screenshots of a payer web application according to an exemplary embodiment.

The payer web app also provides file management capabilities to the payer to enable communication with external parties via files, printouts, or web services. As shown in a screenshot 500a of FIG. 5a, the payer can select a link for file import 505 or dashboard 510. File import 505 allows the payer to import a file for batch processing. The results of the import process will be available on the dashboard. The dashboard 510 allows the user to review the status, results, and manage processes requested.

Figure 5B:
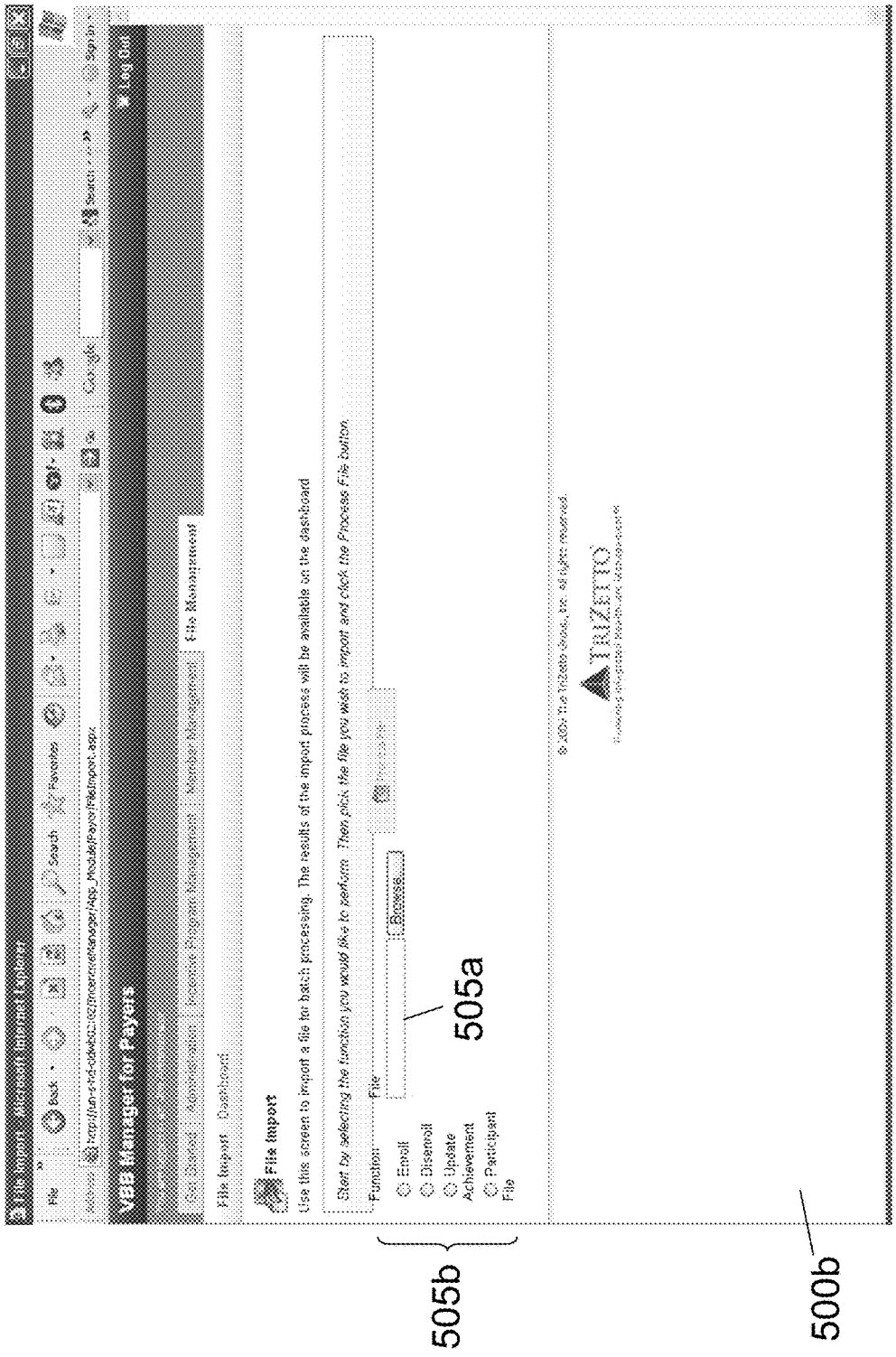

Referring to FIG. 5b, a screenshot 500b for file import 505 is shown. A payer can import a file for enrolling a group of pre-identified members into a program, e.g., diabetes education. A group can be enrolled into a new program, or a group can be dis-enrolled from a canceled program or vendor. Updating a large number of members' statuses, such as the completion of a task by many people, can be time-consuming, but the import and batch processing can expedite the process. The payer can import a file 505a and choose a function 505b from enroll, dis-enroll, update achievement, and participant file. The file can be imported for batch processing, and the results of the import process can be shown on the dashboard.

Figure 5C:

Referring to FIG. 5c, a screenshot 500c of the dashboard 510 is shown. The payer can review a status of longer running processes and files. If a file is uploaded, the dashboard will have a record of all successful updates and failures. Program vendors and reward vendors can access these screens if the payer permits these vendors to access files for their own use or to upload files. The dashboard may be used to supplement a secure FTP site, be integrated with a secure FTP site, or the payer may elect to not expose this set of functionality. The dashboard 510 allows for a search 510a and provides a list of search results 510b. A status 510c is shown for each of the search results 510b.

Referring back to FIG. 1, the VBB manager 100 can receive or transmit messages to a member web application (app) 120. The member web app 120 can be used by the member for incentive management and account maintenance. The member can view incentive program details and rewards, enroll in programs, view programs available for enrollment, and view program compliance. The member web app 120 can also provide a link to a website of a program vendor or a reward vendor. The member web app 120 can be integrated into the member's portal on a payer's website. The member web app 120 can be accessed on a personal computer or other specially configured processing device with network access to the VBB manager 100.

Figure 6A:
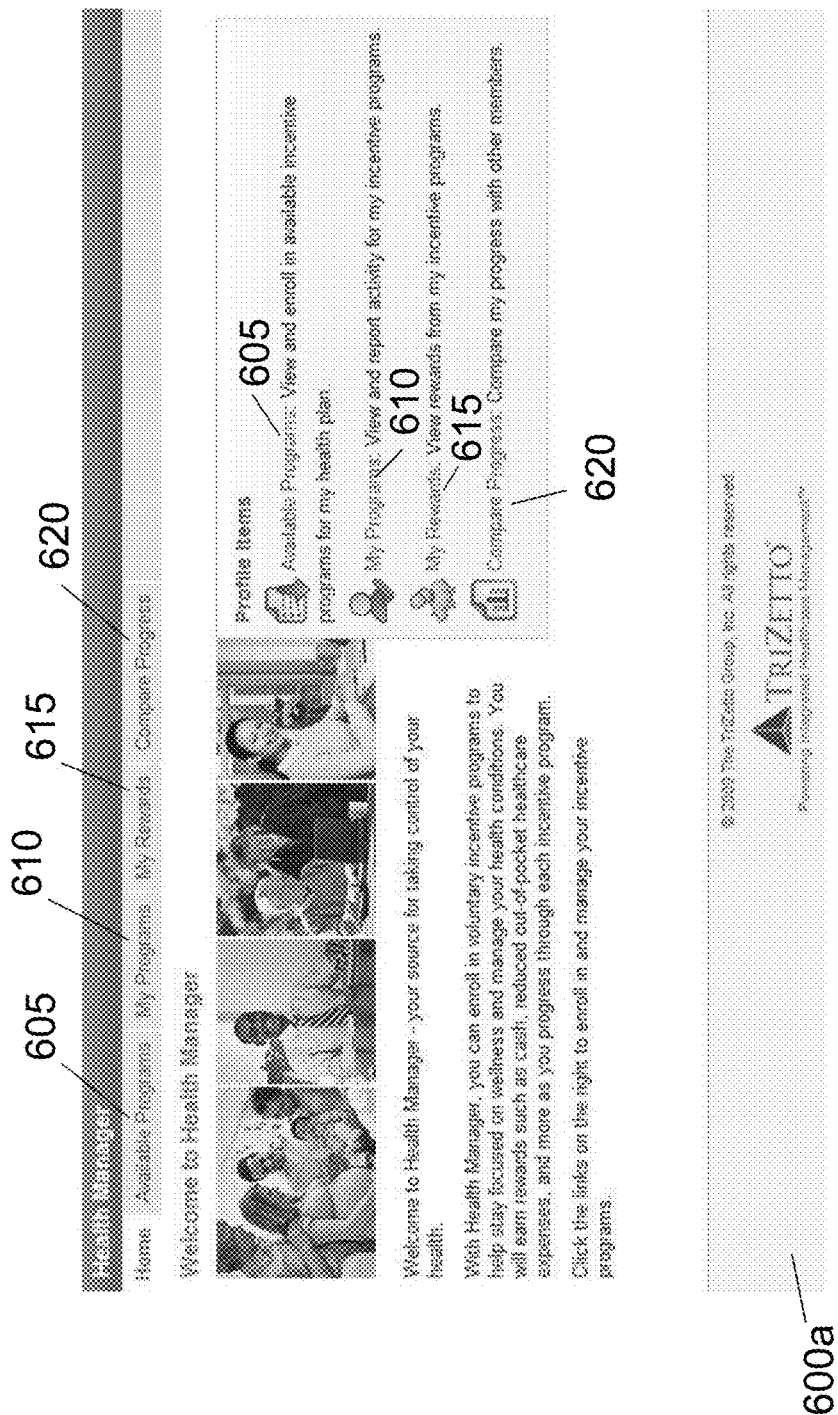

As shown in FIG. 6a, a screenshot 600a of a member web app is shown. The member can click a link for "Available Programs" 605, "My Programs" 610, "My Rewards" 615, or "Compare Progress" 620. Available programs 605 allows the member to view and enroll in available incentive programs for the member's health plan. My programs 610 allows the member to view and report activity for the member's incentive programs. My rewards 615 allows the member to view rewards from the member's incentive programs. Compare progress 620 allows the member to compare processes with other members.

Figure 6B:
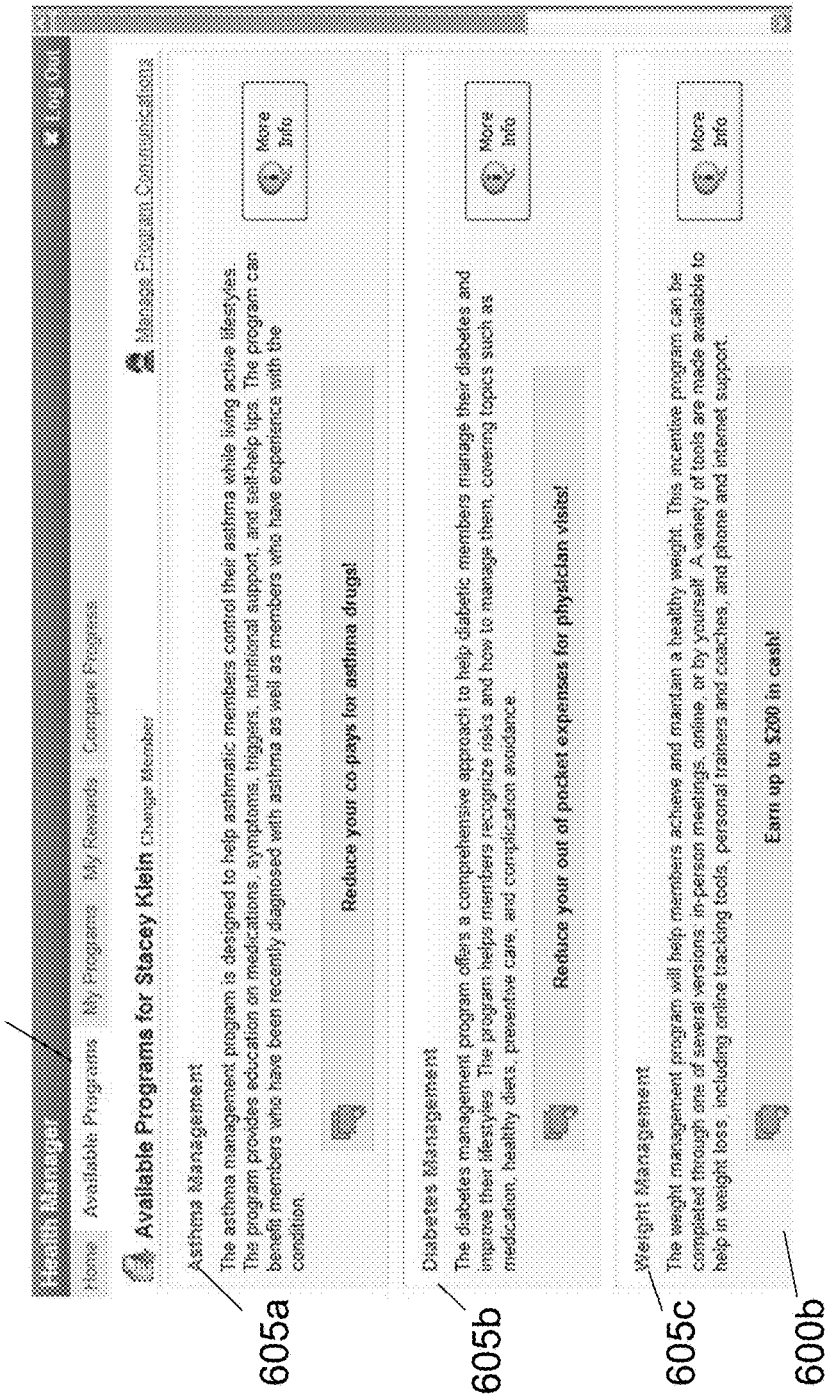

In this exemplary embodiment, a member has selected to view available programs 605. Referring to FIG. 6b, a screenshot 600b of available programs 605 is shown. The member web app displays a listing and corresponding description of available programs for that particular member, including an asthma management program 605a, a diabetes management program 605b, and weight management program 605c.

Enrollment of members in a vendor program can be active or passive. Active enrollment occurs where members actively choose to enroll in the program, and the health plan presents the member with program options. Passive enrollment occurs when members are auto-enrolled in programs based on prior identification as having a target condition such as asthma, and the members choose to participate. Considerations for the type of enrollment include whether members will seek out program information and enroll, how responsive members are to personalized outreach communications compared to general communications for all plan members, whether members have privacy concerns about having a plan that is overseeing their actions, and whether there is enough information to leverage in communication and outreach regarding which members have a chronic disease.

With regard to active enrollment, an exemplary process for the flow of information an active enrollment inventive program is described. First, the enhanced benefits associated with a plan are configured in a claims processing system, such as FACETS/QNXT. The VBB manager can build incentive programs based upon the eligibility, rewards, and other criteria and rules established for the reward vendor, program vendor, and other, for each group, class, and plan.

Second, the members enroll in a program using the member web app. The member web app accesses the VBB manager so that the members can view programs, select a program of interest or a recommended program, and enroll in the program. The VBB manager can capture the enrollment choice and record the selection in a database. The VBB manager notifies the program vendor, whether the program vendor is internal or external, of the enrollment by a member.

Third, the member participates in and completes the incentive program. The program vendor submits completion information to the VBB manager, the member can self-report the completion of the incentive program using an online service, or the member can call a customer service representative who can report the completion. The VBB manager accepts the completion information, validates member eligibility against the stored member record in the VBB manager.

Finally, upon confirmation of eligibility, the VBB manager informs the reward vendor of completion for reward fulfillment. The member progress is then marked as complete in the member's file. The reward vendor can then issue the reward to the member. If the reward is points, a gift card, or cash, the vendor can allocate the points or cash value or arrange for the mailing of the gift card. If the reward is a contribution to a HRA, the VBB manager can sends a message to the HRA administrator or if the administrator is a payer using FACETS/QNXT, then via a real-time service to FACETS/QNXT for a corresponding allocation of the reward to the subscribers account.

With regard to passive enrollment, an exemplary process for the flow of information a passive enrollment inventive program is described. An incentive program can be configured and offered to groups of members. The plan evaluates claim data and/or health assessment data and identifies a certain condition of members, e.g., which members of the population are diabetics. A file of the diabetics is submitted to the VBB manager for enrollment. The VBB manager automatically enrolls the identified members in a program, e.g., enrolling diabetic members in a diabetic program. The VBB manager then notifies the program vendor, whether the program vendor is internal or external. The member can then complete the incentive program. The program vendor submits completion information to the VBB manager, the member can self-report the completion of the incentive program using an online service, or the member can call a customer service representative who can report the completion. The VBB manager accepts the completion information, validates member eligibility against the stored member record in the VBB manager. Upon confirmation of eligibility, the VBB manager informs the reward vendor of completion for reward fulfillment. The member progress is then marked as complete in the member's file. The reward vendor can then issue the reward to the member. If the reward is points, a gift card, or cash, the vendor can allocate the points or cash value or arrange for the mailing of the gift card. If the reward is a contribution to a HRA, the VBB manager can sends a message to the HRA administrator or if the administrator is a payer using FACETS/QNXT, then via a real-time service to FACETS/QNXT for a corresponding allocation of the reward to the subscribers account.

Figure 6C:
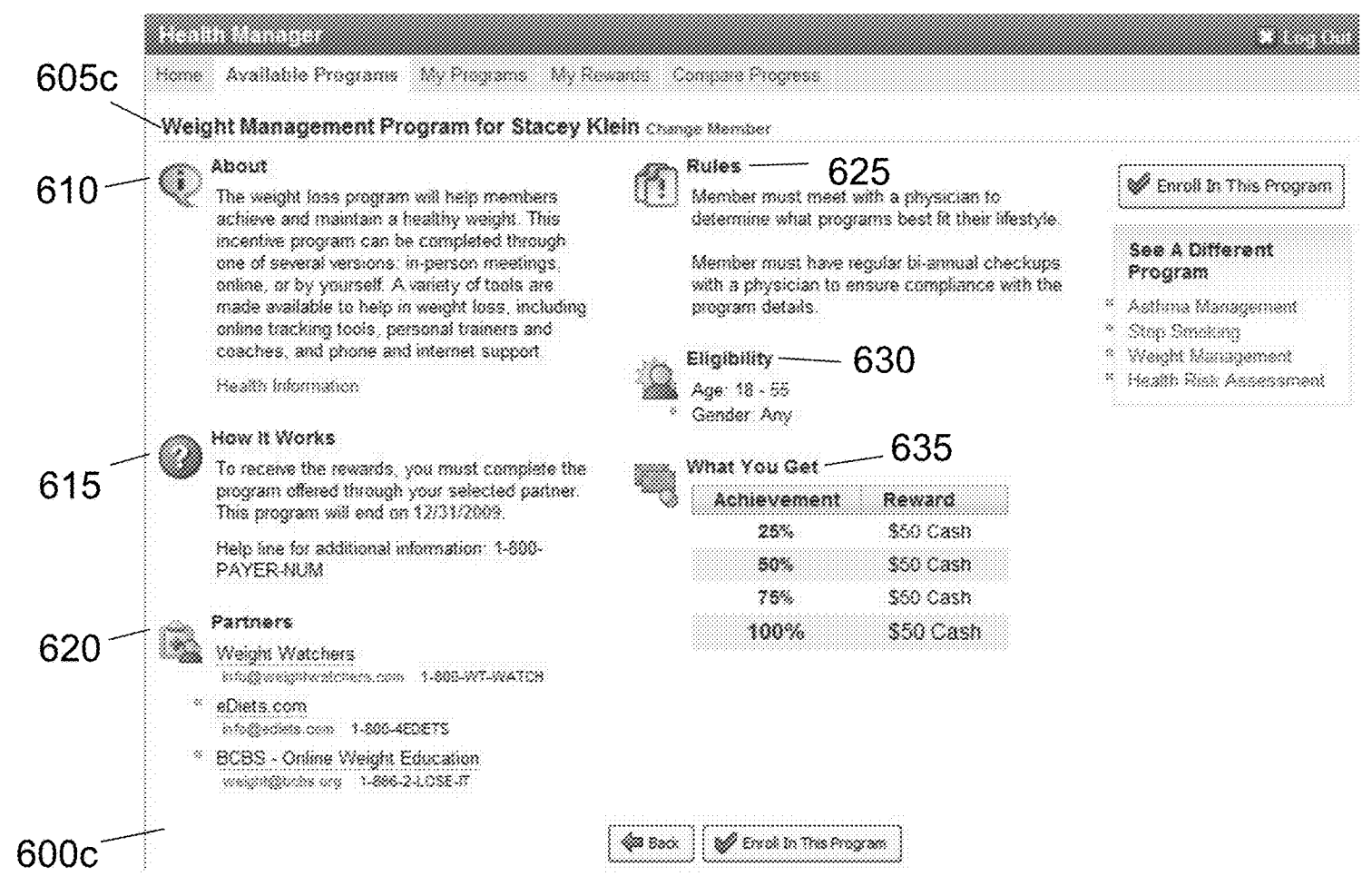

In FIG. 6c, the member is shown a screenshot 600c of a weight management program 605c selected by the member. The member web app can provide information about the weight management program 605c, including a description 610, how it works 615, program vendors 620, rules 625, eligibility 630, and rewards 635.

Figure 6D:
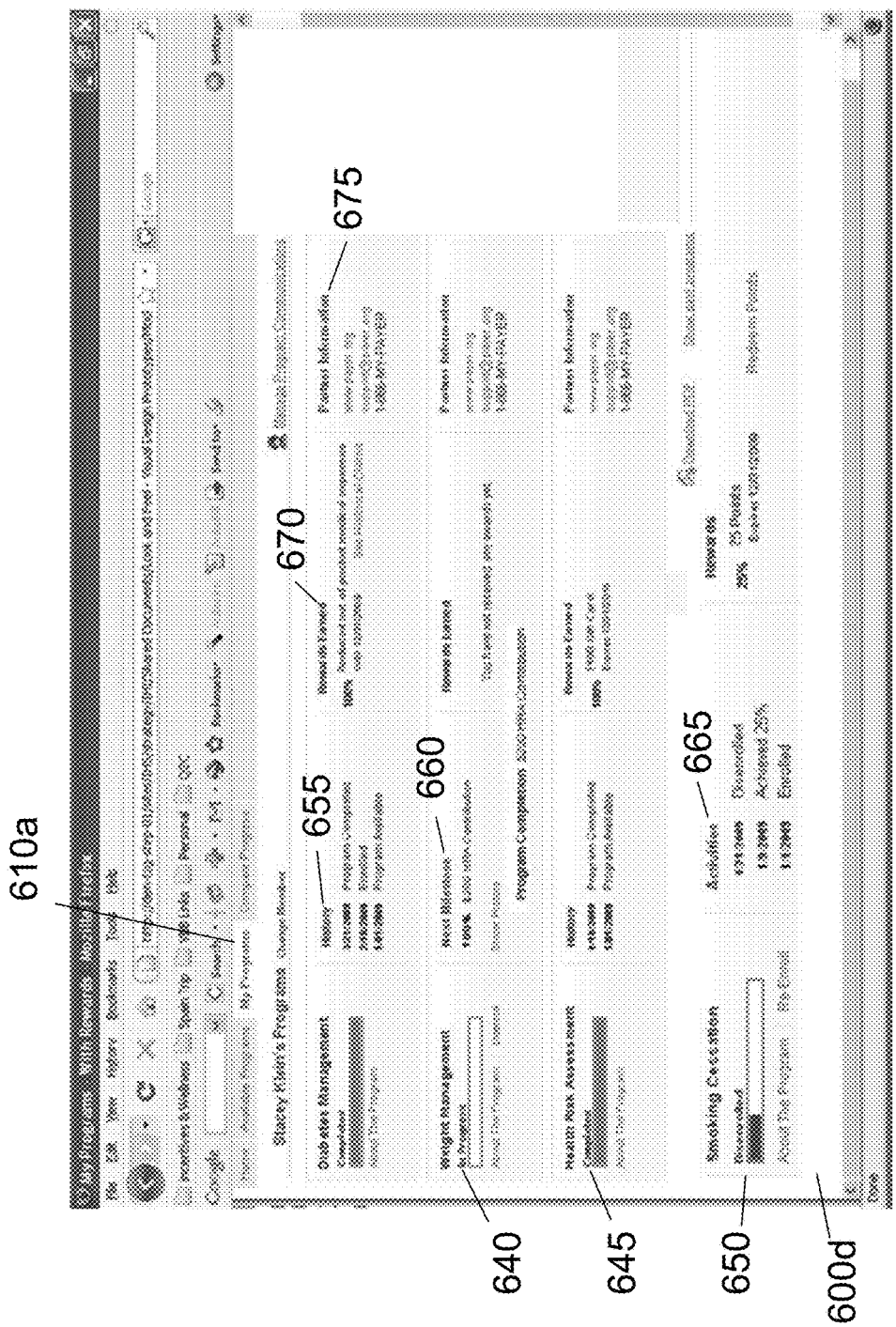

The member can then redeem earned rewards by selecting the rewards from the list. Referring to FIG. 6d, a screenshot 600d of the members programs 610a is shown. A listing shows each program that the member is participating 640, completed 645, or dis-enrolled 650, and includes a history 655, next milestone 660, activities 665, rewards earned 670, and partner information 675. The member can select the rewards earned 670 for a particular program and can be redirected via single sign-on to the reward vendor's website for viewing the member's point balance and redeeming the points for merchandise or a gift card.

In the exemplary embodiment shown in FIG. 6, a member web app is shown. However, it is understood that the functionality of the member web app can be exposed via web services so that payers can create their own graphical user interfaces.

For redemption of rewards, members without internet access or accessibility to the member web app 120, the member can call the payer's customer service representative to initiate an action over the telephone on behalf of the member. Alternatively, the member could use a mail-in form to redeem rewards.

Referring back to FIG. 1, The VBB manager 100 can receive or transmit messages to a program vendor web app 130. The program vendor web app 130 can manage health and wellness initiatives and programs, member eligibility for programs, and program completion data. The program vendor can access member lists for outreach, log member compliance, and communicate with the payer regarding program details. The program vendor can use the program vendor web app 130 to obtain lists of eligible or enrolled members; receive fees as a web service, report, or file to import into the program vendor's system, communicate with the VBB manager 100 and payers, and manage file requests. The program vendor web app 130 can access the VBB manager 100 on a personal computer or other specially configured processing device with network access to the VBB manager 100.

The VBB manager 100 can receive or transmit messages to claims processing system (e.g., FACETS) 140. The claims processing system 140 can manage eligibility data, provide VBB program support, and process enhanced benefit claims. The servers and/or databases of the claims processing system 140 can communicate with the server of VBB manager 100 through a communication network.

The VBB manager 100 can track if members are compliant with the terms of the incentive programs and are eligible for a reward. For example, if the member completed an education program or if the member completed a health risk assessment. Member compliance data can be submitted to the VBB manger 100 in various ways. The VBB manager 100 can update information in a database that corresponds to the member's account and the reward. Using this database, the VBB manager 100 can assess eligibility of the member.

Once the VBB manager 100 knows that the member is compliant and hence eligible for a reward, a web service is sent to the claims processing system 140 to alert the claims processing system 140 that the member is eligible for an enhanced benefit. Upon receiving the member eligibility information, the claims processing system 140 can set the member's status to eligible for that specific enhanced benefit and all claims with a service date of that day forward can be paid at the enhanced level. All claims for the remainder of the health plan year can be paid at the enhanced level unless the claims processing system 140 receives notification from the VBB manager 100 that the member is no longer eligible.

The claims processing system 140 can support member-specific HRA contributions as a reward for completing an incentive program. The claims processing system 140 can receive a notification from the VBB manager 100 that a member has completed an incentive program and is eligible for an HRA contribution. The claims processing system 140 can accept the information from the VBB manager 100 in real-time and allocate the funds into the member's account. The funds can then be available for use by the member for any medical services provided during that HRA year. The allocation contribution amounts are subject to the same rollover rules as all other funds in the HRA.

The VBB manager 100 can receive or transmit messages to a reward vendor 150. The rewards vendor 150 can manage reward incentives, points, merchandise, gift cards, and other reward options and maintenance. Upon determining eligibility of a member and compliance with a program, the VBB manager can send information from an associated database to the reward vendor providing information about the member and the reward to be fulfilled. In one example, the reward can have a specific identifier, such as a serial number, for identifying the reward. The servers and/or databases of the rewards vendor 150 can communicate with the server of VBB manager 100 through a communication network.

The VBB manager 100 can receive or transmit messages to a PBM 160. The PBM 160 can manage member eligibility for prescription drug benefits. The servers and/or databases of the PBM 160 can communicate with the server of VBB manager 100 through a communication network.

The VBB manager 100 can receive or transmit messages to payroll 170. Payroll 170 can manage member eligibility for a cash or premium share change. The servers and/or databases of payroll 170 can communicate with the server of VBB manager 100 through a communication network.

The VBB manager 100 can receive or transmit messages to an employer or broker web application (employer web app) 180. The employer web app 180 can be used by the employer for program tracking and reporting. The employer web app 110 can be accessed on a personal computer, mobile phone, or other specially configured processing device with network access to the VBB manager 100. Additionally, the servers and/or databases of the employer can communicate with the server of VBB manager 100 through a communication network.

The VBB manager can also include additional capabilities. For example, the VBB manager can perform auto-enrollment for populations of interest. A payer may submit a file containing a population of interest, such as those members that have diabetes, and auto-enroll members in diabetic programs. The population of interest identification can be done via an external process or by a VBB component. The VBB component manager can also be used for compliance analytics, such as evaluating those members who completed a program to trigger a reward. The VBB component can also contain program effectiveness evaluation capabilities, such as computing a return on investment and assessment of program impacts to overall claim cost trends. A payer may also wish to perform analytics on a group of members, such as evaluating prior claims experience to identify diabetic members.

Figure 7:
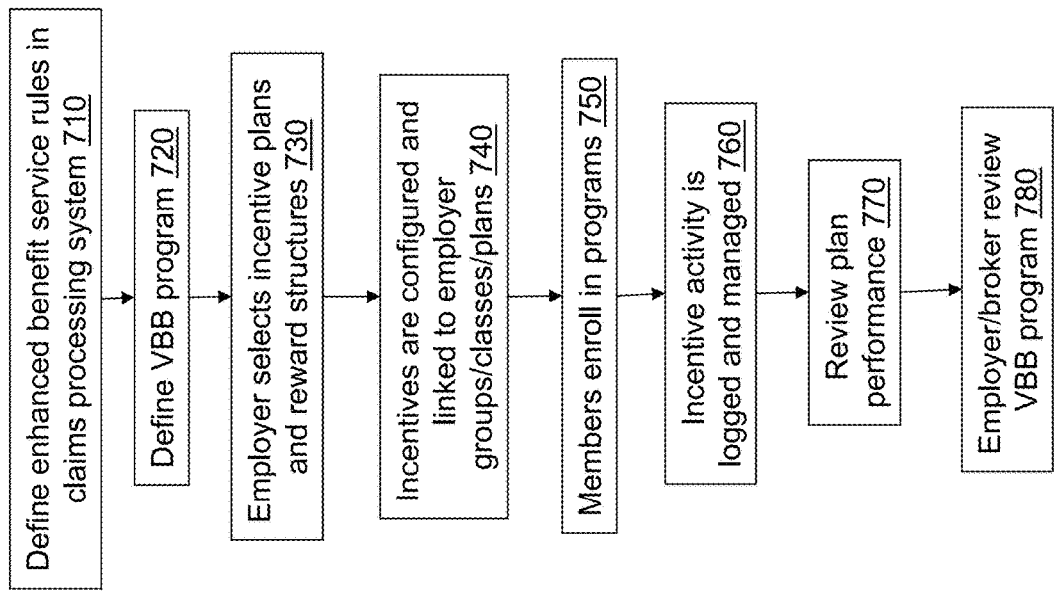
FIG. 7 shows a process for establishing a VBB program according to an exemplary embodiment.

Referring to FIG. 7, an exemplary process for establishing a VBB program is shown. At 710, enhanced benefit service rules are defined in the claims processing system (FACETS/QNXT).

At 720, a VBB program is defined. A payer reviews VBB incentive plan options and can design VBB incentive plans to offer based on claims analysis.

At 730, the employer selects incentive plans and reward structures. The payer reviews the VBB program with an employer or a broker of the employer. The payer also reviews employee characteristics and problem areas. The employer selects the desired VBB programs.

At 740, incentives are configured and linked to employer groups/classes/plans. The payer configures incentive programs and rewards to offer. The payer links the customized programs to the health plans in the claims processing system.

At 750, members are enrolled in programs. Enrollment can be active or passive enrollment.

At 760, once the VBB program is operating, incentive activity is logged and managed. The payer monitors the VBB program activity. The payer updates member compliance if not done automatically and addresses incoming member calls to answer questions.

At 770, the plan performance is reviewed. The payer evaluates programs, including employer sales rates and member participation levels. The payer reviews program effectiveness, including medical cost and wellness. The payer can also generate reports for the employer or broker.

At 780, the employer or broker reviews the VBB program. The payer can review the effectiveness of the VBB programs with the employer or broker. The payer and the employer can revise the VBB programs based upon the analysis of member population risks.

Figure 8:
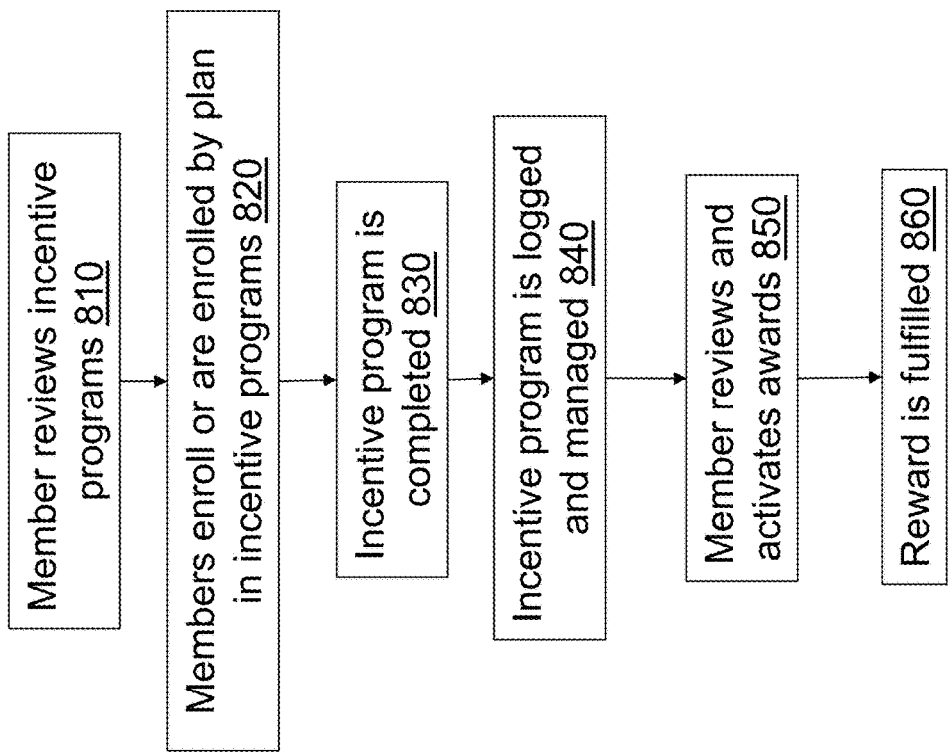
FIG. 8 shows a process for member involvement in a VBB program according to an exemplary embodiment.

Referring to FIG. 8, an exemplary process for member involvement in a VBB program is shown. At 810, a member reviews incentive options and enrolls in desired programs, if enrollment is required.

At 820, members enroll or are enrolled by plan in incentive programs.

At 830, the incentive program is completed. The member completes required activities or achieves a desired outcome. The member logs results into a member web app or can have a customer service representative or program vendor submit the results.

At 840, incentive activity is logged and managed. The payer reviews member compliance, if required. The payer's customer service representative supports members' questions.

At 850, the member reviews and activates rewards. The members view incentive and rewards status on the member web app. The member can request awards if points are available. The member can review an account balance or benefit changes.

At 860, the reward is fulfilled. The member's plan can be adjusted during claims adjudication, the member can receive additional HRA funds, or the member can obtain a reduced premium contribution or merchandise.

Figure 9A:
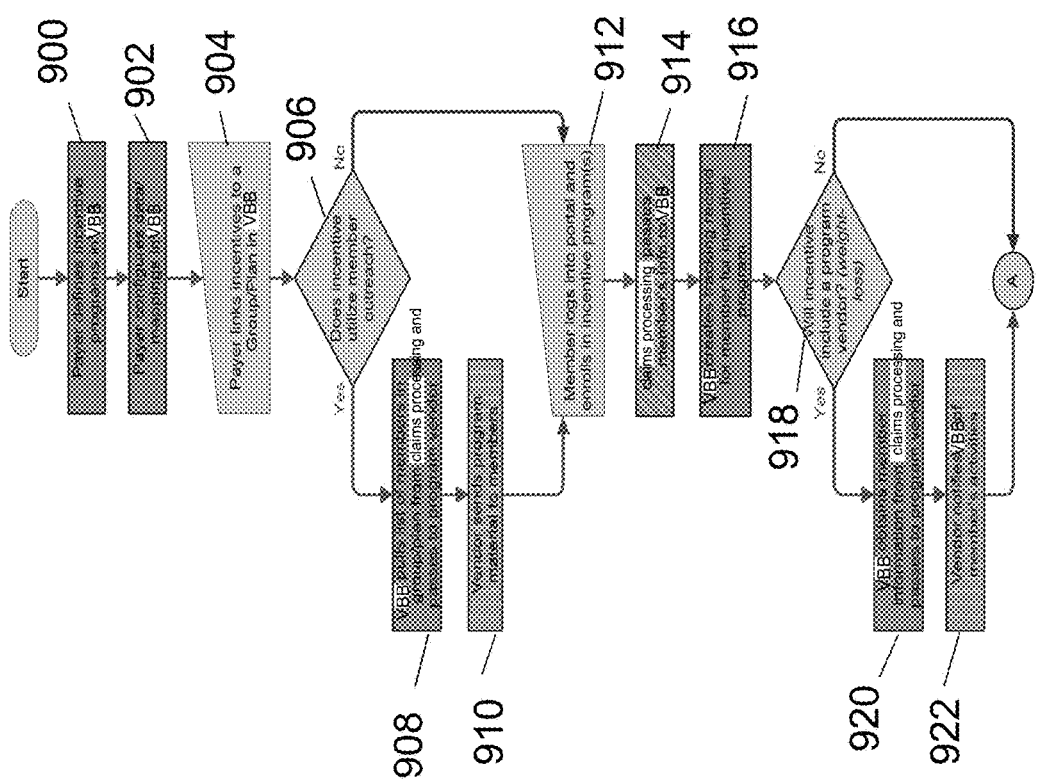
FIGS. 9a and 9b show a process for managing incentive programs according to an exemplary embodiment.
Figure 9B:
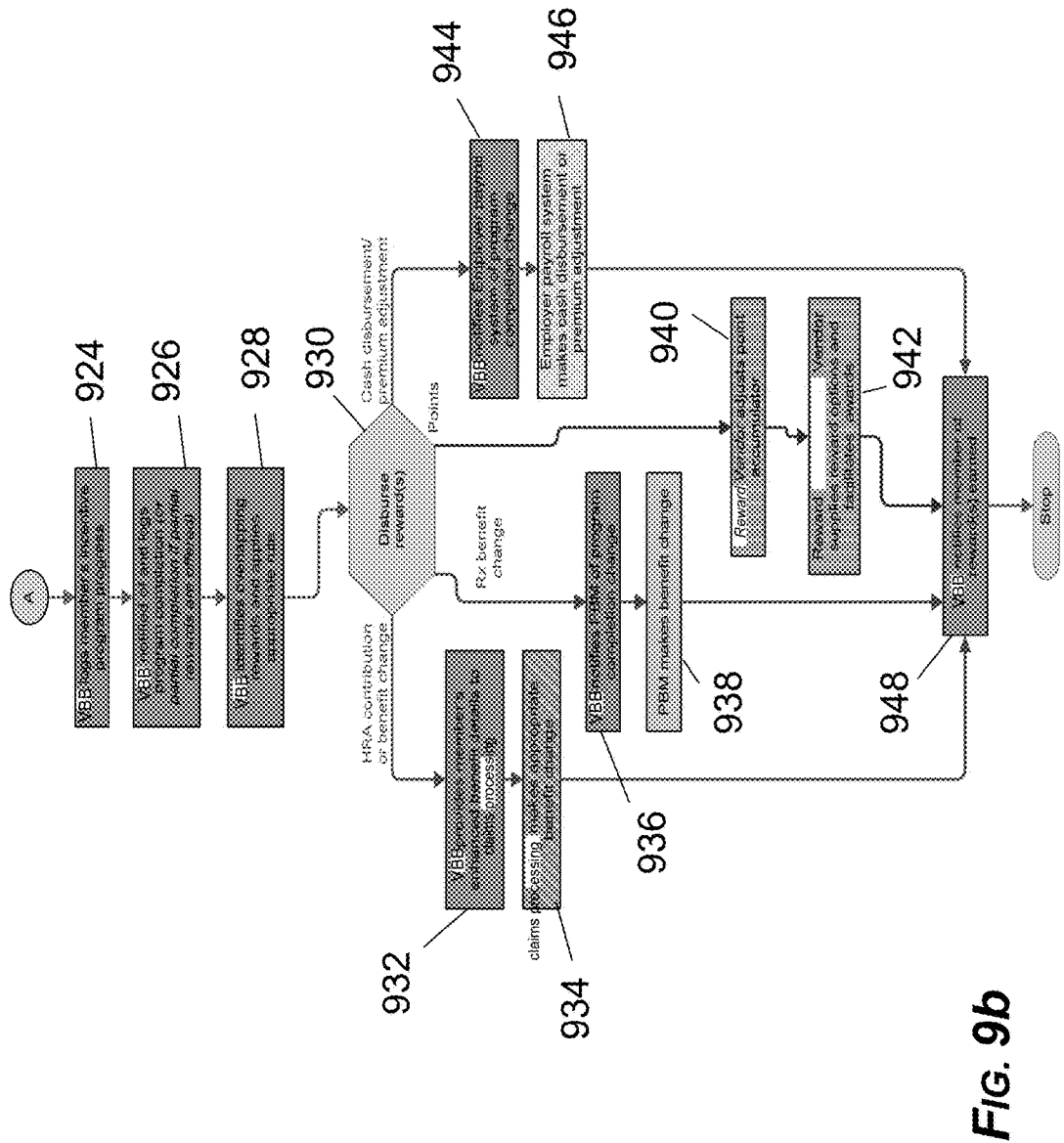

Referring to FIGS. 9a and 9b, an exemplary process for managing incentive programs is shown. At 900, a payer defines incentive programs using a payer web app that access a VBB manager. At 902, the payer configures data and mappings in the payer web app. At 904, the payer links incentives to a group and plan in the VBB manager.

At 906, it is determined whether the incentive utilizes member outreach. If so, at 908, the VBB manager pulls a list of members in the group and plan from a claims processing system and passes it to a program vendor. At 910, the program vendor sends program materials to the members. If the incentive does not utilize member outreach, at 912, the member logs into a member web app and enrolls in the incentive program. At 914, the claims processing system passes the member's information to the VBB manager. At 916, the VBB manager creates a tracking record for the member participating in the incentive program.

At 918, it is determined whether the incentive includes a program vendor. If so, at 920, the VBB manager obtains member information form the claims processing system and passes it to the program vendor. At 922, the program vendor notifies the VBB manager of member's activities. If the incentive program does not include a program vendor, at 924, the VBB manager logs the member's incentive program progress. At 926, the VBB manager is notified of and logs program completion, including partial completion if partial rewards are offered. At 928, the VBB manager identifies overlapping rewards and applies an appropriate rule.

At 930, the reward is disbursed. If the reward is an HRA contribution or benefit change, at 932, the VBB manager provides the member's enhanced benefit details to the claims processing system. At 934, the claims processing system makes the appropriate benefit changes. At 948, the VBB manager notifies the member of the reward earned.

If the reward is a drug benefit change, at 936, the VBB manager notifies a PBM of a program completion change. At 938, the PBM makes the benefit change. At 948, the VBB manager notifies the member of the reward earned.

If the reward is points, at 940, a points vendor adjusts a points accumulator. At 942, the reward vendor supplies the reward options to the member and facilitates the awards. At 948, the VBB manager notifies the member of the reward earned.

If the reward is cash disbursement or a premium adjustment, at 944, the VBB manager notifies the payroll system of a program completion change. At 946, the payroll system makes a cash disbursement or a premium adjustment. At 948, the VBB manager notifies the member of the reward earned.

Figure 10A:
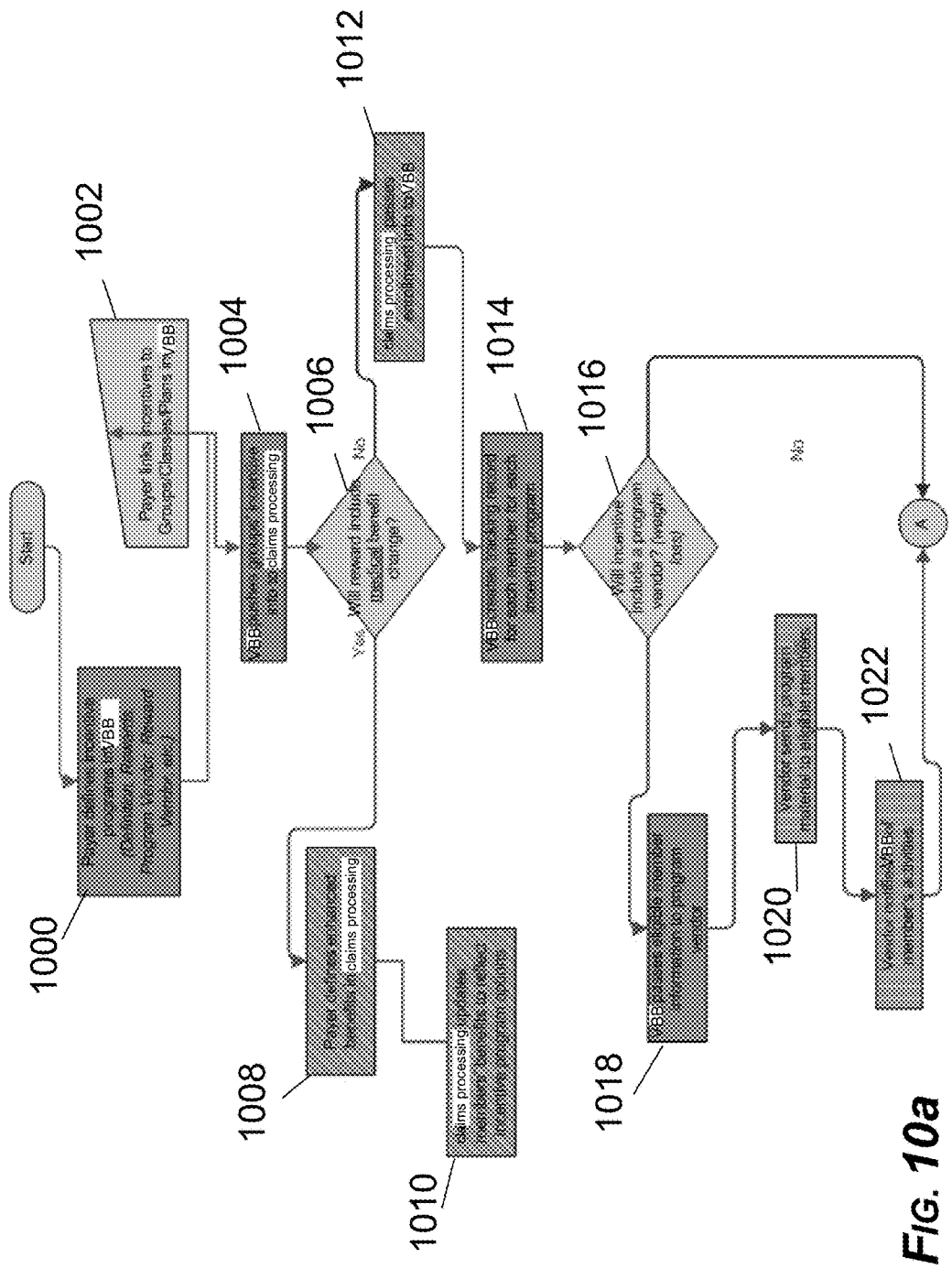
FIGS. 10a and 10b show an alternative process for managing incentive programs according to an exemplary embodiment.
Figure 10B:
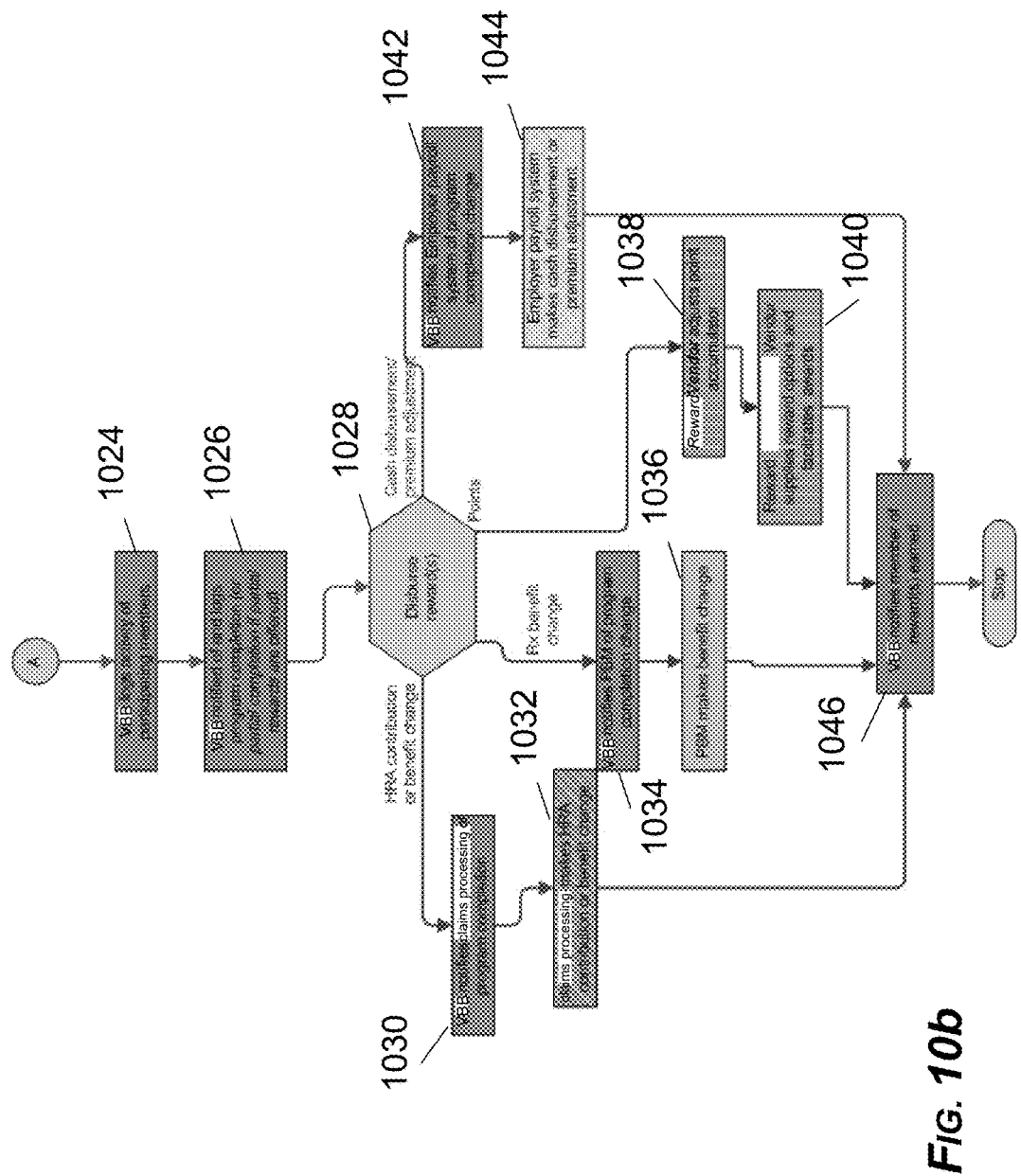

Referring to FIGS. 10*a* and 10*b*, an alternative exemplary process for managing incentive programs is shown. At 1000, a payer defines incentive programs in the VBB system. At 1002, the payer links incentives to groups/classes/plans in the VBB system. At 1004, the VBB system pushes "groups" incentive information to a claims processing system.

At 1006, it is determined whether the reward includes a medical benefit change. If the reward includes a medical benefit change, then at 1008, the payer defines enhanced benefits in the claims processing system. At 1010, the claims processing system updates members' benefits to reflect incentive program options.

If the reward does not include a medical benefit change, then at 1012, the claims processing system passes enrollment to the VBB system. At 1014, the VBB system creates a tracking record for each member for each incentive program. At 1016, it is determined whether the incentive will include a program vendor, such as a program for weight loss.

If the incentive includes a program vendor, at 1018, the VBB system passes eligible member information to the program vendor. At 1020, the program vendor sends program material to eligible members. At 1022, the vendor notifies the VBB system of member's activities.

At 1024, the VBB system logs activity of participating members. At 1026, the VBB system is notified of and logs program completion or partial completion if partial rewards are offered. At 1028, rewards are disbursed.

If the reward is an HRA contribution or benefit change, at 1030, the VBB manager provides the member's enhanced benefit details to the claims processing system. At 1032, the claims processing system makes the appropriate benefit changes. At 1046, the VBB manager notifies the member of the reward earned.

If the reward is a drug benefit change, at 1034, the VBB manager notifies a PBM of a program completion change. At 1036, the PBM makes the benefit change. At 1046, the VBB manager notifies the member of the reward earned.

If the reward is points, at 1038, a points vendor adjusts a points accumulator. At 1040, the reward vendor supplies the reward options to the member and facilitates the awards. At 1046, the VBB manager notifies the member of the reward earned.

If the reward is cash disbursement or a premium adjustment, at 1042, the VBB manager notifies the payroll system of a program completion change. At 1044, the payroll system makes a cash disbursement or a premium adjustment. At 1046, the VBB manager notifies the member of the reward earned.

As members earn enhanced benefits, a real-time message can be transmitted to the VBB manager. The VBB manager determines the eligibility of the member with respect to the enhanced benefits. If the VBB manager determines that the member is eligible, then all future claims for the member can be paid at the enhanced level. PBMs can receive enhanced benefit eligibility as a web service in real-time or as a file-based service, based on the capabilities of the PBM.

When the member completes an enhanced benefit program and the VBB manager determines that the member is eligible for the enhanced benefit, the reward vendor can be notified in real-time using the web service or using a file-based service, based on the capabilities of the reward vendor. The member can then use a single sign-on (SSO) to access the reward vendor's website to claim a reward as soon as that reward has been earned.

Each employer can arrange for a custom program, including customizable program eligibility requirements and customized rewards. For example, Joe's Trucking can offer both hourly and salaried employees the opportunity to participate in a smoking cessation program. If an employee of Joe's Trucking tests smoke-free three months after finishing the program, the employee would earn the associated reward. Joe's Trucking may also want to offer the hourly employees a $500 reward and the salaried employees a 25% reduction in their medical plan premium contribution. The VBB program allows customization of multiple rewards for a single member. Additionally, two members in the same group, class, and plan can complete a program and each receives a different reward. For example, a first member may select a contribution to a HRA and the second member may select a gift card for a particular merchant.

The VBB program can vary co-pays for certain drugs and supplies for members with specific conditions or vary coinsurance on specific medical claims for members with certain conditions or who have pre-qualified. Conventionally, drug benefits are divided in three tiers. A first tier includes most generic drugs and receives 10% coinsurance. A second tier includes most preferred brand name drugs, including those drugs for asthma, diabetes, and hypertension, and receives 30% coinsurance. A third tier includes non-preferred brand name drugs, including those for asthma, diabetes, and hypertension, and receives 50% coinsurance. In a customized drug benefit plan, a first tier includes most generic drugs and all brand name drugs for asthma, diabetes, and hypertension, and receives a 10% coinsurance. These drugs were typically available in conventional plans at a higher coinsurance rate in the second and third tiers. In the customized plan, a second tier includes most preferred brand name drugs and receives a 30% coinsurance. A third tier includes non-preferred brand name drugs and receives 50% coinsurance. By removing barriers and creating incentives to care for a particular condition (e.g., asthma, diabetes, and hypertension), health care costs can actually decrease. Other effective examples include removing the co-pay for office visits related to that condition or offering free weight management or smoking cessation classes.

The VBB program described herein has advantages over the conventional systems. The VBB program can allow payers to offer a VBB program to encourage members' health and wellness activities that employers are increasingly requesting; provide rewards for healthy behavior that directly affects members' out-of-pocket costs (e.g., co-pays and deductibles) to reinforce the value of healthy behavior in lowering that member's health care costs; structure rewards to reflect the health benefit and clinical benefit associated with various activities and health care services; customize benefits at the individual member level; improve member-at-work productivity through reductions in time out of work for health-related reasons; educate members about how to care for themselves and family members, especially those with a chronic disease; maximize the payer's administrative efficiency in establishing and managing value-based benefit and incentive programs; and provide a centralized integration platform for the communication and management of program vendors, reward vendors, PBMs, payroll systems, and others. Additionally, the VBB program can remove barriers to effective care to encourage better chronic condition management; reduce incidence of high-cost low-value procedures; improve the health of members and realize gains from increased productivity; provide the extra "push" members need for health management and chronic disease care; supply capabilities increasingly being requested by employers; and improve overall member health.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

The systems and methods described herein as software can be executed on at least one server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

What is claimed is:

1. A health care management system including a value based benefits architecture for implementing and managing health-based incentive programs available to eligible members of a health plan, comprising:

a value based benefits application server configured to execute a value based benefits manager module and a payer web application, an employer web application and a member web application each including multiple interactive and interdependent display screens to facilitate implementation and management of the health-based incentive programs, the payer web application being configured to display a first dashboard including first tabs to multiple payer web application screens to facilitate construction of templates for each of multiple incentive programs, wherein the multiple payer web application screens, when selected allow a payer to configure the multiple incentive programs and define eligibility rules of the payer for a reward of each of the multiple incentive programs, allow the payer to select one or more vendors other than the payer to provide the reward of each of the multiple incentive programs according to eligibility rules of the one or more vendors for the reward of each of the multiple incentive programs, allow the payer to build qualification rules for each reward of each of the multiple incentive programs provided by a vendor, wherein the qualification rules include one or more qualifiers to be applied by a claims processing system to each claim line item in a member claim, the one or more qualifiers being selected from the group consisting of claim type, claim sub-type, place of service, procedure code, revenue code, diagnosis code, provider type, provider specialty, network affiliation, service performed by primary care physician, primary drug benefit, secondary drug benefit, member's age, member's gender, and eligibility based on class, plan, product type, and product category, and allow the payer to associate at least one of each the multiple incentive programs with one or more health plans;

the employer web application being configured to allow an employer of the member to select at least one of the one or more health plans including associated incentive programs;

the member web application being configured to display a second dashboard including second tabs to multiple member web application screens to facilitate selection of one or more of the multiple incentive programs in accordance with the employer selected one or more health plans, wherein the multiple member web application screens, when selected display details of each of the multiple incentive programs available to the member, facilitate selection by the member of one or more of the multiple incentive programs in which to participate, and allow a member to manage the member's participation in the selected one or more incentive programs, and the value based benefits manager module being configured to, determine eligibility of the member for the reward of the incentive program selected by the member based on the eligibility rules of the vendor for the reward and the eligibility rules of the payer for the reward, and notify the payer or the payer selected vendor that the member is eligible for the reward;

a database coupled to the value based benefits application server and configured to store records having data relating to an incentive program; and a communication network for transmitting between the value based benefits application server and a payer computer and between the value based benefits application server and a member computer and between the value based benefits application server and the employer and between the value based benefits application server and the vendor.

2. The health care management system according to claim 1, wherein the vendor comprises a claims processing system and the value based benefits manager module is communicatively coupled to the claims processing system.

3. The health care management system according to claim 1, wherein the vendor comprises a rewards vendor and the value based benefits manager module is communicatively coupled to a computer of the reward vendor.

4. The health care management system according to claim 1, wherein the vendor comprises a pharmacy benefit manager and the value based benefits manager module is communicatively coupled to a computer of the pharmacy benefit manager.

5. The health care management system according to claim 1, wherein the vendor comprises a payroll system and the value based benefits manager module is communicatively coupled to the payroll system.

6. The health care management system according to claim 1, wherein the value based benefits manager module is communicatively coupled to a computer of a program vendor.

7. The health care management program according to claim 1, wherein the member web application is further configured to allow the member to report compliance with each of the multiple incentive programs.

8. The health care management system according to claim 1, wherein the payer web application is further configured to display multiple payer web application screens to facilitate defining effective and termination date terms of an enhanced benefit as the reward of each of the multiple incentive programs.

9. The health care management system according to claim 1, wherein the payer web application is further configured to display multiple payer web application screens to facilitate defining effective and termination date eligibility terms for the reward of each of the multiple incentive programs.

10. The health care management system according to claim 1, wherein the payer web application is further configured to display multiple payer web application screens to facilitate management of each of the multiple incentive programs for an entire group, plan, or class of members.

11. A computer-implemented method for managing and implementing health-based incentive programs available to eligible members of a health plan administered by a payer, the method comprising:

presenting, by a payer web application of a value based benefits application server, a first dashboard including first tabs to one or more payer web application screens to facilitate construction of templates for each of multiple incentive programs, the one or more payer web application screens displaying options for configuring multiple incentive programs, defining eligibility rules of the payer for a reward to an eligible member of one or more of the multiple incentive programs, associating the one or more of the multiple incentive programs with one or more health plans;

to select a vendor other than the payer to provide the reward of the incentive program according to eligibility rules of the vendor for the reward of each of the multiple incentive programs;

to build qualification rules for each reward of each of the multiple incentive programs provided by a vendor, wherein the qualification rules include one or more qualifiers to be applied by a claims processing system to each claim line item in a member claim, the one or more qualifiers being selected from the group consisting of claim type, claim sub-type, place of service, procedure code, revenue code, diagnosis code, provider type, provider specialty, network affiliation, service performed by primary care physician, primary drug benefit, secondary drug benefit, member's age, member's gender, and eligibility based on class, plan, product type, and product category;

receiving, by the payer web application of the value based benefits application server, a selection of each of the multiple incentive programs and the vendor to provide the reward of each of the multiple incentive programs;

associating, by the payer web application of the value based benefits application server, each of the multiple incentive programs to each of the one or more health plans;

presenting, by an employer web application of the value based benefits application server, a second dashboard including second tabs to one or more employer web application screens for
   displaying an option for selecting at least one of the one or more health plans including associated incentive programs;
   receiving a selection of an associated health plan and one or more incentive programs;
storing, in a database communicatively coupled to the value based benefits application server, information regarding the selection by an employer of the associated health plan and one or more incentive programs;
determining, by a manager module of the value based benefits application server, eligibility of a member for the reward of the one or more incentive programs selected by the member's employer based on the eligibility rules of the vendor for the reward and the eligibility rules of the payer for the reward and submitting a request to the vendor to determine if the member has an eligible status;
storing, in the database, information regarding participation by the member in the one or more incentive programs; and
notifying, by the manager module of the value based benefits application server, at least one of the payer and the selected vendor when the member is eligible to receive the reward.

12. The computer-implemented method according to claim 11, wherein the vendor comprises a claims processing system, a rewards vendor, a pharmacy benefits manager, or a payroll system, and the method further comprises providing, by the manager module of the value based benefits application server, information regarding the associated health plan and one or more incentive programs to the vendor.

13. The computer-implemented method according to claim 11, wherein completion of one or more incentive programs comprises completing a specified task of the one or more incentive programs.

14. The computer-implemented method according to claim 11, further comprising transmitting, by the manager module of the value based benefits application server, information about members to the vendor for hosting the one or more incentive programs.

15. The computer-implemented method according to claim 11, further comprising receiving, by the value based benefits application server, information about completion of the one or more incentive programs.

16. The computer-implemented method according to claim 11, further comprising determining, by the manager module of the value based benefits application server, whether a member is eligible for a partial reward for completion of a portion of requirements for the partial reward of the one or more incentive programs.

17. The computer-implemented method according to claim 11, further comprising:
   generating, by the manager module of the value based benefits application server, a list of members for participation in the one or more incentive programs; and
   automatically enrolling the members in the one or more incentive programs.

18. The computer-implemented method according to claim 11, wherein the method is performed by the server in real-time.

19. The computer-implemented method according to claim 11, wherein requesting comprises compiling a plurality of requests and transmitting the plurality of requests as a batch.

20. A computer-implemented method for managing and implementing health-based incentive programs available to eligible members of a health plan, the method comprising:
receiving, by a manager module of the value based benefits application server, a selection by a member of an incentive program in which to enroll via at least a first displayed member web application screen, the incentive program being associated to the member's health plan by the member's employer and configured by a payer and including a reward for completion of one or more requirements thereof by the member, the reward being provided by a vendor other than the payer;
receiving in real-time, by the manager module of the value based benefits application server, a notification that the member has completed at least a portion of the incentive program;
storing, in a database, information about completion of the incentive program;
determining, by the manager module of the value based benefits application server, eligibility of the member for the reward of the incentive program based on eligibility rules of the vendor for the reward and eligibility rules of the payer for the reward and submitting a request to the vendor to determine if the member has an eligible status;
presenting, by the manager module of the value based benefits application server, an option to the member for activating the reward via at least a second member web application screen displayed to the member; and
transmitting, by the manager module of the value based benefits application server to the vendor, a message indicating completion of the incentive program and approval for the reward for the member, wherein the vendor is a claims processing system which applies qualification rules for the reward, the qualification rules including one or more qualifiers applied to each claim line item in a member claim, the one or more qualifiers being selected from the group consisting of claim type, claim sub-type, place of service, procedure code, revenue code, diagnosis code, provider type, provider specialty, network affiliation, service performed by primary care physician, primary drug benefit, secondary drug benefit, member's age, member's gender, and eligibility based on class, plan, product type, and product category.

* * * * *